(12) United States Patent
Kraft

(10) Patent No.: US 6,954,549 B2
(45) Date of Patent: Oct. 11, 2005

(54) LOCAL DIGITAL IMAGE PROPERTY CONTROL WITH MASKS

(75) Inventor: Walter Kraft, Zurich (CH)

(73) Assignee: Gretag Imaging Trading AG, Wettingen (CH)

( * ) Notice: Subject to any disclaimer, the term of this patent is extended or adjusted under 35 U.S.C. 154(b) by 645 days.

(21) Appl. No.: 10/067,789

(22) Filed: Feb. 8, 2002

(65) Prior Publication Data
US 2002/0141640 A1 Oct. 3, 2002

(30) Foreign Application Priority Data
Feb. 9, 2001 (EP) .......................................... 01102802

(51) Int. Cl.⁷ .............................................. G06K 9/00
(52) U.S. Cl. ...................... 382/167; 382/274; 358/518; 358/520; 345/77; 345/589
(58) Field of Search ................................ 382/274, 167, 382/168, 190, 260, 254, 255, 266, 164, 269, 199, 206, 264; 358/447, 461, 518–523; 430/546, 618; 345/20, 63, 77, 589–593, 596, 606, 611, 617, 618

(56) References Cited

U.S. PATENT DOCUMENTS

| 6,055,340 | A | * | 4/2000 | Nagao .......................... 382/261 |
| 6,200,738 | B1 | * | 3/2001 | Takano et al. ............... 430/362 |
| 6,262,818 | B1 | * | 7/2001 | Cuche et al. ................... 359/9 |
| 2002/0034336 | A1 | * | 3/2002 | Shiota et al. ................ 382/274 |

FOREIGN PATENT DOCUMENTS

| EP | 0 475 897 A1 | 3/1992 |
| EP | 0 586 773 A1 | 3/1994 |
| EP | 0 771 342 | 4/1998 |
| EP | 0 959 616 A2 | 11/1999 |
| EP | 0 971 314 A2 | 1/2000 |
| EP | 0 971 315 A2 | 1/2000 |
| EP | 1 024 400 A1 | 2/2000 |
| WO | WO96/02600 | 2/1996 |
| WO | 0 933 924 A2 | 8/1999 |

OTHER PUBLICATIONS

R. W. G. Hunt, "Color reproduction by photography", Rep. Prog. Phys. 1977, 40, pp. 1071–1121).

Polesel, G. Ramponi, "Image Enhancement via Adaptive Unsharp Masking". IEEE Trans. Image Processing, vol. 9, No. 3, pp. 505–510, Mar. 2000.

* cited by examiner

Primary Examiner—Kanjibhai Patel
Assistant Examiner—Ali Bayat
(74) Attorney, Agent, or Firm—Buchanan Ingersoll pc

(57) ABSTRACT

Disclosed is a process for the location dependent correction of photographic image data representing an image with a multitude of image elements, whereby the image data determine color values and at least one image property for the image elements, including the steps of: determining a correction mask with a multitude of correction elements based on the photographic image data to be corrected, whereby the correction elements are assigned to the image data and determine correction changes for the image data corresponding to the image element, the correction changes corresponding to changes of the at least one image property; and applying the correction mask to the image data, whereby the image data are changed corresponding to the correction elements.

30 Claims, 9 Drawing Sheets

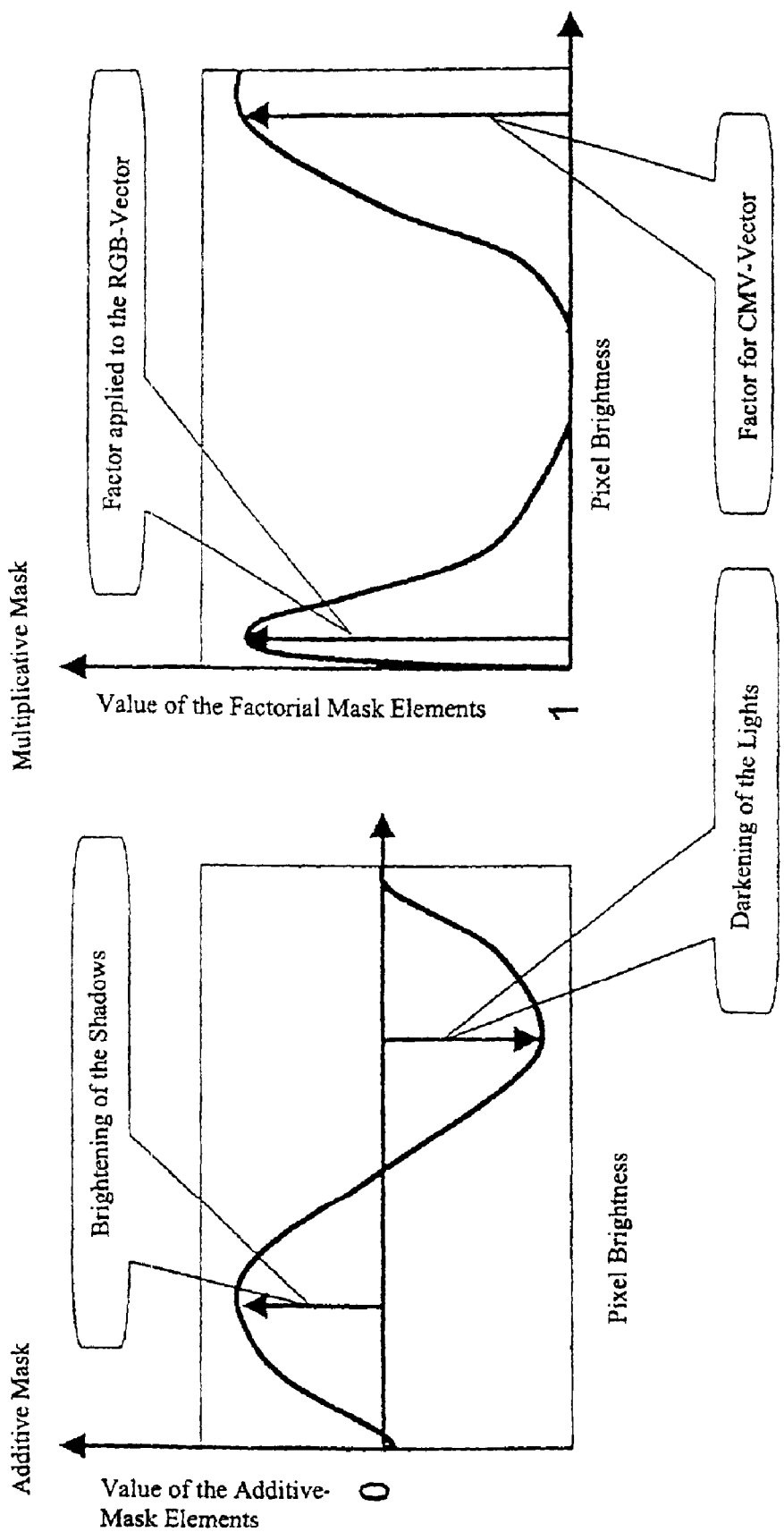

LOCAL DIGITAL IMAGE PROPERTY CONTROL WITH MASKS

This application claims priority under 35 U.S.C. §§ 119 and/or 365 to 01102802.4 filed in Europe on Feb. 9, 2001; the entire content of which is hereby incorporated by reference.

FIELD OF THE INVENTION

The field of the present invention relates to the processing of photographic image information, which represents the photographic image, with the help of data processing, especially hardware and software. More particularly, the invention relates to a process for the local digital image property control by way of correction masks in order to carry out a location dependent correction on photographic image data which leads to a position dependent change of at least one image property in the image represented by the photographic image data. The invention further relates to a process for the expansion of a data range, which describes the image properties, which process is employed in combination with the above mentioned correction process. Finally, the invention relates to an apparatus for the process, a program corresponding to the process, a computer storage medium with the program and photographic printing devices or photographic printer, photographic labs, especially minilabs or microlabs which use the process, apparatus or programs in accordance with the invention.

BACKGROUND ART

The term "photography" as used herein refers in particular to the (e.g. "permanent") capture of images produced by electromagnetic radiation (especially light) by means suitable therefor (for example, camera with film, digital camera with CCD chip, film camera, video camera, and so on). Photographic image information represented the photographic, digital image data. The photographic image data can originate directly from a digital camera or, for example, from a scanner which scans a film. They can also be electronically stored, (for example, CD ROM, DVD) or accessed or transmitted through a network (for example, LAN or internet or wireless phone network or cellular phone networks or UMTS etc.).

The photographic image data are transformed by a printer or a photographic lab so that an image is produced on a physical medium or a monitor. The physical medium is, for example, photographic paper or regular paper (with toner or ink). However, the quality of the photographic image achieved thereby is not always satisfactory. A significant reason therefor is that the gamut region of the original image information cannot be transformed onto the imaging medium.

Brightness differences, for example, which often were still recognizable for the photographer while looking through the sight during capture of the photographic image information are no longer recognizable by an observer of a photographic reproduction based on the captured photographic image information, when those brightness differences are located in a dark or very bright region of the photographic reproduction. The EP 1 024 400 discloses a suggestion for the solution of this problem by way of masks. However, it does not teach the use of other image properties.

SUMMARY OF THE INVENTION

The present application relates apart from the brightness also to other image properties, such as, for example, the colour tone, the colour saturation, the intensity of individual colours (colour intensities), local image properties which are based on the optical interaction of adjacent image elements, such as, for example, the contrast (contrast of the brightness, contrast of certain colours) and so on.

The global contrast, in the following also only called "contrast", corresponds especially to differences (and/or the ratio) between the maximum and minimum brightness in the (whole) image. The global contrast is preferably determined based on an image, which was subjected to an image detail removal process. Preferably, the global contrast is determined based on an image with a reduced resolution. The advantage is thereby that the sensitivity to noise and to inessential image details is reduced.

The detail contrast, which is in the following also referred to as local contrast, describes especially the difference (or the ratio) between the maximum and minimum brightness in a certain vicinity of an image point. Preferably, the detail contrast again is determined on the basis of an image, which was subjected to a detail removal process and especially an image of reduced resolution.

Principally, the image focus is limited by the resolution capacity of the camera optics. This is characterized, for example, by the "modulation transfer factor" (as a function of the local frequency). An inexact focussing causes an additional lack of focus. With insufficient depth focus, not all objects of a scene can be imaged with equal focus. The focus is preferably determined on the basis of the high resolution image. Accordingly, the focussing correction mask described in the following is preferably applied to the high resolution image (fine image). As a measure for a lack of focus, for example, a number of the pixels can be used over which a sharp edge is "smudged". The focus perception can be improved, for example, by filtering (with a filter which elevates the higher local frequencies).

It is an object of the invention to enable local changes of the image properties in the image.

This object is according to the present invention by using one or more masks for the correction of the photographic image data, which masks are herein referred to as correction masks. The elements of the masks are associated with locations in the image. Those locations can be image elements (pixels) or image regions or image portions with several elements. The relationship between the elements of the mask and the locations is preferably clear (objective), which means each mask element is associated with exactly one location (for example, an image element) and vice versa. The individual locations preferably do not overlap.

Thus, with the help of a mask a location dependent correction can be applied to the photographic image data, whereby the individual mask elements determine for the different locations how to correct at the respective locations.

Masks are to be understood herein in particular as a mathematical assignment or association rule or as a matrix which assigns a value or a function respectively to an image portion, the value or the function being in particular a mask element or a matrix element. An image portion has to be considered herein in particular as the image element or as a number or plurality of image elements. If there are more than one image element, the image elements of an image portion are preferably adjacent or connected. This characteristic applies in particular for the image portions of a coarse image, as will be discussed below.

The application of masks is known especially from the analogue processing of films, whereby with the help of unfocussed masks the brightness profile of the reproduction is changed during an exposure process. The mask is thereby positioned in the exposure beam and modifies the exposure intensity. A so-called hybrid masking, which combines a digital calculation of the mask with an influencing of the exposure beam path is known from the above mentioned EP 1 024 400. Purely digital masking is known from EP 0 971 315, EP 0 971 314, EP 0 959 616, EP 0 771 342 and EP 0 933 924.

The present invention relates not only to masks with elements for the influencing of the brightness at certain image locations, whereby the elements are calculated based on the brightness data at the respective locations, but in general to masks which influence an image property, which need not be the brightness. An image property is an appearance property of the image observed by a human observer and especially of the image regions or image portions such as, for example, brightness, color tone, color saturation, intensity of a color (for example, the value of R with a RGB vector or the value of C with a CMY vector), color value, sharpness (of the image), contrast, mean brightness, mean color, relative number of points with a characteristic color (for example, "memory color"), global contrast (difference between maximum and minimum brightness), fine and mean detail contrast, histogram of the brightness values (feature vector), color histogram (feature matrix), mean color saturation, brightness gradient left/right, up/down, and so on. Image properties are described, for example, in R. W. G. Hunt, "Color reproduction by photography", REP. PROG. PHYS. 1977, 40, pp. 1071–1121).

The image data define in particular color values. This definition or setting is performed in particular locally. The image data describes in particular a local arrangement of the color values (which may also describe black and white images). Thereby, the above-mentioned image properties (at least one image property) are defined which relate in particular to image portions, i.e. in particular to single image elements or local arrangements of image elements.

In accordance with the invention, the correction mask is determined from the photographic image data (for example, original image data) to be corrected. For the determination of the elements additional information can also be used, for example, information on the type of camera, which is present in addition to the photographic image data and associated therewith.

The elements of the correction mask are referred to as "correction elements". The correction elements are associated with locations in the image which relate to portions of the image. Such an image portion can correspond to an image element (pixel), whereby one image datum is exactly associated with one pixel. However, image portions can also include several image elements. The correction elements determine the correction for those image data which relate to the image portions and determine the image property therefor. The changes which are determined by the correction elements are referred to as correction changes. The correction elements also determine the change in the image portions of at least one image property which is assigned thereto. For example, a correction element describes a brightening factor, which determines how the image portion assigned to the correction element is to be brightened.

The correction mark defines in particular local changes, i.e. in particular changes in the image portions of the image. The changes are performed in particular in two dimensions with a local resolution or in case of holographic images or three dimensional images in three dimensions with a local resolution.

In order to achieve the correction, the correction mask is applied to the image data. The application describes in general a mathematical correlation between the image datum or the image data which are, or is, assigned to a specific image portion and the correction element assigned to the image portion. An image property is extracted therefor from the image datum or the image data, for example, the brightness described by the image data and the image property mathematically correlated with the correction element. For example, the value of the correction element is added to the value of the brightness of the image data in order to achieve a brightening. A suitable colour space is preferably selected for this correlation, whereby before and/or after the correlation a transformation into another colour space can be carried out.

It is an especial aspect of the invention that by use of one or more correction masks and a corresponding selection of the mathematical correlation of correction elements of image data not only one image property but several image properties can be corrected.

It is an essential aspect of the invention that the correction masks are constructed in such a way that detailed information contained in the image is not lost. For this purpose, the elements of the correction mask are preferably constructed such that they correct adjacent image elements as equally as possible or with little difference. Different methods can be used to achieve this. For example, image data representing the image can be subjected to a process before and/or after the correction which causes a softening, for example, a data reduction process (for example, down sampling process), a low pass filtering, an averaging process or a Gauss filter. By way of these processes, which serve the removal of image details, images are produced which reproduce the original image without details, i.e., "coarse". Such images are referred to in the following as "coarse images". Out of focus masks can be produced based on these coarse images. Preferably, the unfocussed masks are calculated on the basis of the low resolution image (coarse image) which was achieved, for example, by down sampling, whereby processing capacity to be especially saved. Images which include the image details and thus were not subjected to a detail removal process, are in the following referred to as "fine image". The image data representing the fine image are referred to as "fine image data". The correction masks can be determined directly from the fine image data. However, for the reasons mentioned above, they are preferably determined on the basis of the coarse image data which were derived from the fine image data (original image data). Correspondingly, the coarse image is derived from a fine image (original image).

The coarse image is represented by coarse image data which result from a detail removal process. The coarse image, like the original image (fine image), also includes a multitude of image elements which are in the following referred to as "coarse image elements", whereby "coarse image portions" can be the same as one coarse image element or can include several coarse image elements. A correction mask which is achieved based on the coarse image data is referred to as coarse correction mask, the elements of which relate to the coarse image portion. The elements of the coarse image mask describe changes which are referred to as "coarse changes" and determine the change of the image properties or at least one image property of the coarse image portion. The coarse changes are designed with a view to the correction changes which are to be carried out by the correction mask. Thus, for example, if the correction mask is to change the brightness profile, the elements of the coarse correction mask are constructed such that they change the brightness profile of the coarse image. If the coarse image was produced by a data reduction process, the correction mask can then be produced by an expansion process ("up sampling"). Since the coarse changes describe changes which can also be carried out by the correction mask the correction changes are therefore based on the coarse changes. If the number of the coarse image elements corresponds to the number of the fine image elements, and the coarse image therefore includes less detail, but no data reduction process was used, the correction mask can be equated to the coarse correction mask.

The invention preferably provides a process wherein the following steps are carried out for determination of the correction mask:

A data reduction process is applied to the image data to be corrected (coarse image data) so that the reduced image data resulting therefrom represent a coarse image with a lower resolution than the original image, whereby the original image includes a multitude of coarse image elements and coarse image portions, whereby a coarse image portion includes a number of coarse image elements;

A coarse correction mask is determined which for the reduced image data corresponding to the course image elements determines coarse changes for the coarse image portions, whereby the coarse changes correspond to at least a part of the changes which the correction changes are to make in the image portions;

The correction mask is determined based on the coarse correction mask by application of the expansion process to the coarse elements so that the correction changes are based on the coarse changes.

If the coarse changes correspond to only a part of the changes carried out by the correction mask, i.e., if they, for example, change only one image property, while the correction mask corrects two image properties, the correction mask can be determined based on several coarse correction masks of which, for example, one coarse correction mask describes the change of the brightness and the other correction mask the change of the colour saturation. The correction mask determined therefrom then describes both a change of the brightness as well as a change of the colour saturation. Alternatively, a first correction mask is determined on the basis of a first coarse correction mask and a second correction mask on the basis of a second coarse correction mask. It is an advantage of this process that the second coarse correction mask can be obtained based on reduced image data (coarse image data) which were already corrected by the first, preceding coarse correction mask. A second coarse correction mask can thereby be determined, for example, which changes the colour saturation depending on how the first coarse correction mask has changed the brightness of the coarse image. A mutual dependence of the corrections of different image properties is thereby achieved. On the basis of the properties of the masks, this of course can also be carried out location dependent.

Also, several correction masks can be determined from the coarse correction masks. These correction masks are then successively applied to the image data to be corrected (fine image data) so that the image data corrected by a preceding correction mask (corrected fine image data) are again corrected by the subsequent correction mask. The individual correction masks can thereby be based on one or more coarse correction masks.

In accordance with the invention, preferably at least one further coarse correction mask is determined as described above. Preferably, each further coarse correction mask is applied to the coarse image data changed by the preceding coarse correction mask.

In the process in accordance with the invention, at least one further correction mask is also determined. The determination of the correction masks is performed preferably such that at least one of the coarse correction masks is used as the basis for the determination of each correction mask.

Alternatively, or additionally, different coarse correction masks can be combined with one another, before based thereon one or more correction masks are determined, whereby preferably different correction masks are based on different coarse correction masks.

Auxiliary masks which were obtained from the analysis of a coarse or fine image (for example, the "skin masks" discussed below) can also be used for the correction of already determined coarse correction masks or correction masks. How each individual element is to be corrected is determined by a respectively associated element of the auxiliary mask.

The use of data reduction processes, especially of "down sampling", can be carried out not only in one step but in two or more steps. Depending on the correction to be carried out, a different image resolution can be considered to be sufficient and to save processing capacity. A lower resolution is generally sufficient for the correction of image properties which can be represented by individual image elements and the image datum (especially the colour value) respectively associated therewith. This concerns, for example, a correction of the brightness, the colour saturation and the colour tone.

When image properties are obtained which are described by more than one image element, such as, for example, the brightness contrast or the colour contrast, a mean resolution of the image is used for the determination of a correction mask.

The invention therefore especially also provides a process in which data reduction processes are applied in at least two steps to the image data to be corrected. The image data resulting from one step thereby preferably serve as the input data for the next step of the data reduction. The process in accordance with the invention then preferably uses for the determination of the correction masks coarse correction masks of different steps, which result from image data of different data reduction steps. For example, one coarse correction mask then exists for the image focus (first step) and a coarse correction mask for the brightness (second step).

The inventors have in particular recognized that a significant improvement of image quality may be achieved if the desired properties of an image are defined for a coarse image which is derived from the image. If in this application text a derived image or derived image data are mentioned, it is to be understood that examples for derived images or derived image data are in particular coarse images or coarse image data, respectively. The desired properties or characteristic of a coarse image are preferably defined as coarse target values. The coarse target values may be determined based on an analysis of the fine image or of the coarse image. If it is based on the fine image, then a detail removal process is preferably applied to the analysation result in order to obtain the coarse target values. Examples for an analysis, e.g. an analysis for a characteristic color are given, when discussing auxiliary masks. As a result of an analysis, the image may be for instance classified. The classes may be for instance sunset, portrait, beach image etc. By performing an analysis, a face may be recognized for instance and a desired (characteristic) color tone or a desired brightness may be defined for the face portion of the image. Furthermore, it may be desired, that the surroundings of the face may have lower brightness than the face itself. Correspondingly, coarse target values may be defined for instance for a color tone or brightness, preferably locally defined, i.e. defined for the respective image portions. Since the coarse target values have been defined for the coarse image, the details of the fine image are not lost if a correction is performed based on the coarse target values. In order to perform a correction, an image detail removal process is preferably performed as a first step in order to obtain the coarse image data. The coarse image data are than compared with coarse target values. The correction mask is then determined based on the coarse target values and the coarse image data. This is performed preferably such that first a coarse correction mask is determined based on the coarse target values and the coarse image data. The application of the coarse correction mask on the coarse image data results in that the corrected coarse image data correspond to the coarse target value or represent an approximation to the coarse target values. Preferably, the correction mask is determined based on this coarse correction mask such that the elements of the correction mask are assigned to the same or similar or overlapping image portions as the elements of the coarse correction mask which represent the basis therefor.

Preferably, the correction mask as determined such that corrected image data are obtained if the correction mask is applied to the image data to be corrected. The corrected image data have preferably the property that if an image detail removal process is applied to the corrected image data, a corrected coarse image is obtained. Then this corrected coarse image has preferably the property that the values of the image portions of the coarse image, which values define the corrected image property, correspond to the coarse target values or represent approximations to the coarse target values.

The coarse target values may not only be defined in that a certain local distribution of the coarse target values is given in the image but also a desired frequency distribution of the values of a image property is given, i.e. a target frequency distribution. Then, the coarse target values are for instance obtained based on the coarse image data and the desired target frequency distribution of the image property values (e.g. brightness values) such that the coarse target values represent the desired frequency distribution. This is performed preferably such that a deviation of the coarse target values from the coarse image data is minor. For this purpose, a least square fit may be for instance applied. Alternatively, the correction mask may be determined directly from the coarse image data and the target frequency distribution such that the target frequency distribution results for the image property values if the image data corrected by the correction mask are subjected to the image detail removal process. The determination of the correction mask is preferably performed via a coarse correction mask which transforms the coarse image data in corrected coarse image data which fulfill the target frequency distribution or which are closer to the target frequency distribution then the uncorrected coarse image data.

The determination of the coarse target values, the target frequency distribution, the coarse correction mask and/or the correction mask is based additionally or alternatively preferably on the mentioned auxiliary masks. Thus, the auxiliary masks serve in particular to manipulate or adjust the presttings for the correction which are defined by a corrections means like the correction mask, the coarse correction mask, the coarse target values and/or the target frequency distribution. For this purpose, the auxiliary masks have preferably the same level of data reduction (resolution level) as the manipulated correction means (e.g. correction mask, coarse correction mask, coarse target values and/or target frequency distribution). The auxiliary masks are preferably obtained based on an analysis of the image data (fine image data or derived image data, e.g. coarse image data). The analysis is performed in particular in order to obtain information about the local distribution of an image property in the image (coarse image or fine image). The auxiliary masks represent preferably a local distribution of a particular image property in the analyzed image. Thus, the above-mentioned correction means (correction mask, coarse correction mask, coarse target values, target frequency distribution etc.) may be locally resolved manipulated by means of the auxiliary masks in order to adjust the correction features or functions of the correction means. By means of the auxiliary masks, this adjustment may be performed optimized with respect to the respective image property. A different adjustment or manipulation of the correction means is preferably performed in dependence on the image property described by the auxiliary masks (e.g. a particular color or color tone, in particular a characteristic color or color tone, brightness etc.). For instance the amount or degree of manipulation of the correction means by the auxiliary masks may be defined in tables for the respective image properties. A weighting or a function may be defined in the tables. This determination of the degree or amount of manipulation by the auxiliary masks may not only be defined in dependence on the image property described by the auxiliary masks but also in dependence on the image property corrected by the correction means and/or in dependence on kind or type of the correction means (correction mask, coarse correction mask, coarse target values or target frequency distribution etc.). In this way a fine adjusted manipulation of the correction means may be performed. In particular, a single auxiliary mask may be used for a plurality or number of manipulations of correction means (even of different kinds). The image property described by the auxiliary mask may in particular be different from the image property which is corrected by the correction means, said correction means being manipulated by the auxiliary mask.

The above-mentioned target frequency distribution may be a frequency distribution for different image properties, in particular for the brightness and/or color tone and/or color saturation and/or color values. In particular it has been observed that an equal or smooth frequency distribution is desired in the case of brightness. In other words, an equal number of image elements or image portions has preferably one of the possible brightness values. The inverse cumulative frequency distribution is preferably steadily increasing, in particular in case of brightness. A target frequency distribution may in particular be chosen for color tones such that a white balance is achieved. If for instance the color values are represented by a (r, g, b) vector, then preferably all r, g and b values are equally often. This may be of cause adjusted in dependence on the image class or on auxiliary masks, wherein it has to be considered for instance that blue and yellow are frequent in beach images.

Furthermore, a equal frequency distribution where each value of a image property is equally often in the single image elements or image portions, may be restricted to a range of values or to a plurality of ranges and or to certain image regions or portions. Preferably, each kind of target frequency distribution may be defined for respective image regions differently. The image regions are preferably separated by means of auxiliary masks and/or pattern recognition, for instance, in order to differentiate face portions and non-face portions. If for instance it has been recognized by means of analysis that the recording of a landscape has been performed when it was raining, then a target frequency distribution of the color saturation may be adjusted accordingly since a stronger saturation of colors is perceived during rain.

Preferably, in case a mask (e.g. correction mask, coarse correction mask, auxiliary mask) is determined based on another mask (e.g. correction mask, coarse correction mask, auxiliary mask) or changed and/or manipulated then, only those elements of the masks influence each other or have only an essential influence on each other which relate to the same, overlapping and/or adjacent image portion. This applies in particular if the two masks which relate to a different kind of data reduction level (resolution level). Preferably, the auxiliary masks are determined based on an analysis of the coarse image. This auxiliary mask may then be used in order to manipulate a coarse correction mask. Based on the manipulated coarse correction mask, then the correction mask may be for instance determined via an expansion process. Alternatively, the auxiliary mask, if corresponding to a coarser data reduction level(resolution level), may be expanded and then be used for manipulating the correction mask.

The photographic image data to be corrected are preferably designed such that they describe color values in a color space. The color space can be of different types, such as Lab color spaces or CIELab color spaces, RGB color spaces, sRGB color spaces, HSV and HLS color spaces, CMYK color spaces, XYZ color spaces, Luv color spaces, and so on.

In general, the correction of one specific image property influences the perception of another image property. For example, the colour saturation in brightened under-exposed regions or in darkened over-exposed regions is often perceived too little. Thus, an interaction exists upon perception of the image properties. The inventors of the present application have discovered that this interaction can be taken into consideration during correction of an image-as described further below-in that, for example, several image properties are corrected simultaneously by one correction, or in that one correction is carried out based on the other correction.

If it is a colour space the dimensions of which describe colours, such as, for example, the RGB or CMY colour spaces, the colour values can be represented by vectors in this colour space. Especially in that case, the correction changes which are carried out at least by one correction mask, according to one embodiment preferably include changes which can be represented by a mathematical operation which encompasses the multiplication of the vectors with a factor. The elements of the correction mask therefore correspond to factors or represent a mathematical operation which includes factors. These factors or the mathematical operation are then applied to the image data which are especially represented by vectors. The inventors of the present application have discovered that such a mathematical operation leads, for example, to a change of the image data, which includes a change of the brightness as well as the colour saturation.

According to one embodiment, a correction mask is constructed such that its elements include vectors and/or scalars which are combined with the vectors which represent the image data by application of a mathematical operation which especially includes a multiplication. The mathematical operation preferably additionally or alternatively encompasses the addition.

As was already mentioned above, it is known in the art to determine a mask which changes the brightness based on information on the brightness. In accordance with the invention, not only one image property is changed but preferably at least two. The changes to one image property which are evoked by the correction mask are thereby preferably based at least also on information on another image property and not only on information on the same image property. For example, a correction mask can be determined which determines the colour saturation depending on information on the image brightness and/or depending on how the image brightness is to be changed. The correction change relating to one image property is thus determined, for example, based on how strongly the other image property is changed. Because of the use in accordance with the invention of masks, this can of course be carried out with local resolution and therefore location dependent.

A first correction change of a first image property is caused on the high resolution image by a first correction mask. The corrected, high resolution image can then be analysed. Based on this analysis, which, for example, determines the local distribution of a specific image property, a second correction mask can be determined. The latter then carries out a second correction change by which then preferably another image property is locally changed then in the first correction change. The first and second correction changes can be carried out mathematically in one step (by way of a correction mask) or preferably in several steps (by several correction masks) or by a (weighted) combination of several correction masks or coarse correction masks. However, the analysis is preferably carried out with an especially low resolution image without details with the help of the above mentioned coarse images and coarse correction masks. For example, a coarse mask is determined by analysis of the brightness profile of the coarse image, which mask describes a change of the brightness profile. This coarse mask is then applied to the coarse image. Thus, based on the specific coarse mask, a corrected coarse image is determined. Based on the analysis of this coarse image and/or the coarse mask, a further coarse mask is then determined, which, for example, fixes the change of the colour tone depending on the brightness profile described by the corrected coarse image and/or by the extent of the change of the brightness profile which is fixed by the first coarse mask.

A further example for the correction of an image property depending on another image property is the correction of the brightness as a function of the colour tone. A correction mask which describes the change of a brightness profile and/or a sharpness profile is preferably determined depending on the colour tone. The elements of the correction mask are thus determined especially depending on the colour tone which is respectively given in that image portion associated with the respective element of the correction mask. For the face colour, for example, nominal ranges exist for the contrast and/or the brightness. The correction mask which corrects the brightness and/or the contrast, is then constructed in such a way that at least an approximation to preselected nominal values or nominal ranges is achieved. With flash photography, for example, the faces are often over-exposed and with photographs taken against the light the faces are under-exposed. The face recognition can then be carried out by way of the colour value, especially the colour tone and/or the colour saturation. Correspondingly, sky portions which can also be recognized by way of the colour value, especially the colour tone and/or the colour saturation, often appear too dark or too bright and therefore appear "washed out". The green of vegetation is, for example, often too black in the shady regions. On the basis of the color value, especially the color tone/or the color saturation, the vegetation can be recognized and the shadow regions then brightened (for example, by way of auxiliary masks) depending on the color value (dependent on the color tone and/or the color saturation).

Characteristic color tones/color values for characteristic image portions, such as, for example, skin, vegetation, sky, beach, streets in a multitude of photographic images are not limited to one point in the color space. Based on a statistical analysis of a multitude of photographic images, correlation rules were created which determine whether or not a specific image point can be considered of a characteristic color. Preferably, the correlation rules are mathematically formulated as distributions in the color space. Color values, especially color tones or the color saturation which are located within a region (one dimensionally, or two-dimensionally, or three-dimensionally) in the color space, which is determined by the distribution, are considered part of a characteristic color which is associated with this distribution. Preferably several distributions for different characteristic colors (for example, skin colors, vegetation colors, and so on) are made available for the analysis of the image data and the color values of the image data are analysed to see whether they can be assigned to a specific characteristic color (especially also to which degree this assignment applies, see below).

The color tones in the image are determined based on the image data to be corrected or on image data which were derived from the image data to be corrected. For example, the color tones are determined in the above mentioned coarse images and one then analyses whether any color tones are amongst the determined color tones which belong to the characteristic color tone, i.e. for example, fall under the distribution.

The elements of the correction mask or the coarse correction mask on the basis of which the correction mask is then calculated, are determined depending on whether the image portions associated with the mask elements are assigned to the characteristic color tone or not. Preferably, the elements of the correction masks set the changes of the brightness and/or the contrast depending on whether or not the associated image portions belong to the characteristic color tone. This is preferably carried out under the consideration of the nominal brightness and/or the nominal contrast which is assigned to the characteristic color tone. Auxiliary masks are preferably used in this case for the determination of the correction mask (or the coarse correction mask) the elements of which determine which fine image elements (or coarse image elements) belong to the characteristic image region and which do not, or how strong the degree of match is.

Thus, if, for example, several different characteristic color tones are recognized in the image, a nominal brightness (target brightness) and/or a nominal contrast (target contrast) is preferably assigned to each characteristic color tone. By way of the assignment rules present for each characteristic color tone it is then determined which image portions belong to which characteristic color tone.

The assignment rule is preferably not only constructed as a yes/no rule, but sets the degree of match of a color tone with a characteristic color tone. This degree of match can be determined by a match factor (for example, "skin indicator"). The latter can be determined, for example on the basis of a statistical analysis. The match factor of a color tone is determined depending on how often it was associated with a characteristic color tone. For example, the match factor can also determine the probability of the match of a color tone with a color tone group. The brightness and/or the contrast are then preferably determined under consideration of the nominal brightness (target brightness) and/or the nominal contrast (target contrast) as well as under consideration of the match factor which is given for the mask element to be determined of the correction mask or the coarse correction mask. The match factor is thereby assigned to a color tone. The color tone is assigned to an image element and the image element in turn is assigned to the mask element to be determined. If, for example, the match factor indicates a low match only a small change of the brightness and/or the contrast is carried out towards the nominal brightness and/or the nominal contrast.

In accordance with the invention, the change achieved by the correction mask can also be made dependent from a color tone independent recognition of characteristic image portions. For example, faces can be recognized by pattern recognition processes or structure recognition processes. The mask elements of the correction mask or coarse correction mask which then relate to the characteristic image portion, for example, a face, are then differently determined than mask elements which do not relate to a characteristic image portion. As already mentioned above, for example, image portions which are recognized as part of a face are treated during correction of the brightness and the contrast in the way as already described above in connection with the characteristic color tones, but without recourse to color tone information. Accordingly, other characteristic image portions, such as, for example, streets or plants can be recognized, the latter, for example, by structural features, without recourse to color tone information or, if desired, also in combination therewith. Image elements which are assigned to characteristic image portions are then assigned nominal image properties (target image properties), such as, for example, nominal brightness or nominal contrast. The elements of the correction mask or coarse correction masks are then designed in such a way that they effect a change of the image data or coarse image data which leads to an approximation to the nominal values (target values). The degree of approximation can then, as already exemplary described above, be made dependent on the degree of match with a characteristic image portion.

The quaitative impression of an image depends essentially on the frequency distribution of image properties. For example, an increase in the image quality was observed when the brightness distribution in an image was approximated to an equal distribution of the brightness. An equal distribution thereby means that each brightness value representable by the image data occurs with the same frequency in the image.

Generally, the frequency distribution describes the frequency of a value as a function of the image property determined by the value. The values quantify an image property in a specific image portion. The change by way of a correction mask is thereby preferably carried out in such a way that the frequency distribution is approximated to a nominal frequency distribution (target frequency distribution), for example, an equal distribution. Preferably, respectively suitable nominal distributions are fixed for the different image properties. For example, a nominal distribution for the detail contrast is desirable in which the mean contrast values occur more often than extreme contrast values.

The inventors have discovered that an improvement of the correction results can be achieved with the correction process in accordance with the invention when the data range taken up by the image properties is widened prior to the carrying out of the correction. This is true especially when the image property is the brightness. For example, some photographic images are created under unfavourable exposure and illumination conditions, which leads to the dynamic region not being fully used.

Preferably, different masks (correction masks and/or coarse correction masks) are combined, whereby the different masks have different correction properties. For example, masks for the expansion, the brightness change and the change of the frequency distribution are combined. The combination can be carried out in such a way that correction masks are combined. However, the coarse masks are preferably combined. A correction mask is then derived from the resulting coarse mask, which includes several or a multitude of corrections, which correction mask then also carries out these several corrections. Preferably, the combination is carried out in such a way that for each correction those portions are separated which are linked with different mathematical operations and that those portions which relate to the same mathematical operation are combined. For example, the additive portion of each correction is combined to a common additive mask and the multiplicative portion of each correction is combined to a common multiplicative mask. Thus, for example, the additive portion of a brightness correction is combined with the additive portion of a color contrast correction of a common additive mask. This can take place on the level of the correction masks (fine image level), but preferably takes place at the level of the coarse masks (coarse image level). In the latter case, the common (combined) additive correction mask is then derived from the common additive coarse mask (combined mask). Correspondingly, the multiplicative portion or brightness correction and the color contrast correction are combined to a common multiplicative mask. This preferably again takes place at the level of the coarse images so that a common multiplicative mask is calculated from which then the common multiplicative correction mask is derived.

Therefore, an expansion of the data range or dynamic range is preferably carried out in accordance with the invention prior to execution of the correction or at a suitable point within the correction, if, for example, several correction masks are used. This expansion preferably relates to all image elements of the fine image.

The expansion is achieved by way of an expansion function. This expansion function is preferably derived from an unfocussed data set (coarse image data), which is achieved by the application of an unsharped process (detail removal process) to the image data to be expanded. An unsharpening process, for example a low pass filter process, a Gauss filter process, an under scanning process or down-sampling process, and so on. The sharpening process leads to extreme values within the unsharped image region not having their full effect. The influence of noise or disturbances on the expansion process is thereby removed. The actual extreme values are thereby not considered during determination of the expansion function. The same applies for real image details which these extreme values take up in the image to be expanded.

In order that after the expansion those desired image details are still visible in the plain image at least to a certain degree, i.e. are not part of the expansion "pushed beyond" the edge of the data range, the expansion function is designed in accordance with the invention such that the expanded, unsharped image data (coarse image data) at least at one edge of the data range do not take on the extreme values of the maximum possible data range. That means they lie within the maximum possible data range and the edge values of the expanded, unsharped image data (expanded coarse image data) are preferably spaced from the extreme values of the maximum possible data range. By adjustment of this spacing, it is possible on the one hand to make disturbing or undesired stray values in the values of the fine image appear less prominently, when the distance is adjusted to be small. On the other hand, desired details in the fine image become more clearly visible by increase of the spacing. The spacing from at least one of the edges of the maximally possible data range is preferably adjustable. The adjustment can be carried out adaptively, for example, depending on the class of the image (sunset image, image taken into the light, flashlight image and so on), and/or depending on an analysis of the image or coarse image, for example an analysis of the local distribution of an image property, especially the image property to be expanded and/or, for example, the analysis of the frequency distribution of an image property. The spacing depends preferably on at least one image property (local or global image property). When the spacing is dependent on a local image property, specific expansion functions are preferably determined for the respective image portions, which functions respectively depend on the at least one local image property. For example, an already determined expansion mask can be corrected depending on an auxiliary mask, whereby the auxiliary mask represents the at least one local image property and the spacing is determined based thereon.

In accordance with the invention, the expansion can also be determined based on the fine image data. The expansion is preferably then also carried out as described above. This means that the expansion does not use the maximal possible data range and that a certain spacing to the extreme values of the maximal possible data range or to at least one extreme value is maintained. This spacing is preferably controllable, especially controllable depending on at least one image property, especially locally controllable depending on local image properties.

If an expansion is carried out for each color channel separately (for example, separately for R, G, or B), i.e. an expansion of color intensities, the spacing from the respective extreme values of the individual color channels is made adjustable. The spacing preferably again depends on the local image properties. The spacing is preferably individually adjusted for the color channels. In this manner, it can be avoided that a color tinge is produced by the expansion of a color channel.

The above description related mainly to the expansion of the image properties brightness and color intensity. Of course, other image properties such as, for example, the color saturation can be expanded accordingly.

The image property to be expanded can be, for example, the brightness. However, the expansion can also be carried out separately for different colors. For example, a respectively separate expansion of the data range for the red, blue and green colors. In particular, the parameter which controls the above mentioned spacing can be made dependent on an analysis of the local color tone distribution in the image (for example the recognition of the color tinge) or a distribution of other image properties, such as, for example, color saturation, especially the analysis of the frequency distribution (for example of a color or a brightness). Information on the characteristic image regions (for example sky) and characteristic colors (for example sky blue) preferably flows into the analysis of the frequency distribution of a color or the analysis of the color tone distribution in the color plane, in order to prevent that a supposed color tinge is corrected.

The invention also provides a device (for example computer with hardware and software) for the location dependent correction of photographic image data, which carries out the above mentioned process. The device includes especially a correction mask determination unit which determines a correction mask with a multitude of correction elements from the photographic image data to be corrected or from image data derived therefrom. This determination is performed in particular in accordance with one of the methods determined herein. The correction mask determination unit therefore preferably includes a storage unit which allows the storage of the correction elements. It preferably further includes a calculation unit which allows the calculation of the correction elements from the image data.

The present invention relates not only to two determined images but also to three dimensional images (holographic images), in which the image data describes a three dimensional arrangement of color values and the masks for instance are represented by three dimensional matrices.

The device preferably further includes an application unit which applies the correction mask to the image data. In order to carry out the mathematical operations to be carried out, the application unit thereby preferably relies on a numeric processor.

The invention further provides a program which causes the computer to carry out the process in accordance with the invention, as well as a computer storage medium in which the program is stored.

The invention further provides an image reproducing apparatus, such as photographic printers (DMD printers, CRT printers, laser printer, inkjet printers, photographic printers, and so on) and monitors (LC-monitor, CRT-monitor) and a combination of monitor and computer (data processing apparatus), especially a PC. The invention especially provides photographic labs such as large labs, minilabs and microlabs. labs. These printers and labs include the device or control device in accordance with the invention which carries out the process in accordance with the invention or computers or data processing apparatus on which the program in accordance with the invention is loaded or runs.

BRIEF DESCRIPTION OF THE DRAWINGS

Advantages and features of the present invention will be discussed in the following description of preferred embodiments by way of example only and with reference to the attached drawings, wherein

FIG. 4a shows the effect of additive masks in accordance with the invention;

FIG. 4b shows the effect of multiplicative masks in accordance with the invention;

DETAILED DESCRIPTION OF THE PREFERRED EMBODIMENTS

Figure 1A:
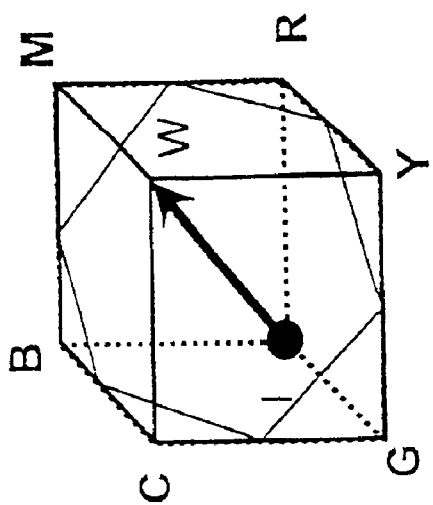
FIG. 1a shows an RGB-color cube.

Almost unlimited possibilities for the image manipulation and image improvement are offered by the herein described purely digital masking. A series of processes can be used for the same purpose, for example, contrast reduction, accentuation of details in the shade and the light, correction of insufficient scene illumination, general improvement of the static appearance of an image.

The process in accordance with the invention is preferably used for the improvement of amateur photographs, especially electronic photographs made with digital cameras. However, the process in accordance with the invention can also be used (directly or with minor parameter adjustments) for other image sources, such as, for example, flatbed scanners, slide scanners, camcorders and negative scanners. In the latter case, the image to be processed should be subjected first to a global balance correction (especially for color and density). Such a balance correction is carried out by conventional automatic photographic printers and is known, for example, from EP 0 475 897 and EP 0 586 773.

The process in accordance with the invention is not linked to a specific output medium (monitor, photographic paper, inkjet printing, and so on). However, it is preferably assumed that the output medium allows a reproduction with approximately photographic quality and, thus, complies with the requirements for photographic images, especially with respect to color tone palet, color saturation range, brightness range, image resolution and contrast. A visually very similar representation on different media can be achieved thereby with today's color management processes (for example, an ICC profile, C profile, see homepage of the International Color Consortium, http://www.color.org). The principle of out of focus masking is illustrated in the following. The unsharps masking allows a spatial separation of coarse total image information and thereby also typically large dynamic variations from especially fine partial image information and thereby typically small dynamic ranges. Apart from the principle of downsampling used in this example, other processes can also be used such as, for example, filter processes or filter banks as disclosed in EP 0 971 315. In the downsampling, the image data of a multitude of neighbouring image elements are averaged (especially weighted) and the mean value is an image datum which is assigned to an element of the so obtained coarse image. The correction masks of the present invention are preferably unsharp masks. Thus, they are based preferably on image data obtained from the original image data by a detail removal process (for example downsampling).

If one assumes, for example, that a flash photograph has an under-exposed background in which there are details, then those details are accentuated after a brightening correction with an unsharp mask. Analogously, details in over-exposed image regions can be made visible by a darkening by way of an unsharp mask. Besides the accentuation of details in the lights and shade, a general improvement of the aesthetic impression is also achieved, since a flash photograph appears more friendly with a brightened background, and a sky otherwise appearing washed out again shows some color.

Since the mask only includes spatially coarse image information, which is in the following for simplification referred to as "unsharp", the mask does not have a disadvantageous influence on the local detail information in the image, which means especially the spatially higher frequency components.

Furthermore, the full resolution original image (typically 1024×1280 pixels) need not be present for the calculation of an unsharp mask, and an image of strongly reduced (which means, for example, by one or two orders of magnitude) resolution (typically 40×50) is sufficient. This has a beneficial effect on the calculation and storage capacities required by the image analysis.

A mask is preferably determined based on the image analysis of the image of strongly reduced resolution (coarse image). Such a mask is herein also referred to as "coarse mask". Before the coarse mask is applied to the original image, it is preferably converted into a mask (correction mask) which is adapted to the resolution of the original image, and especially corresponds to this resolution, which means it has the same number of image elements. A data expansion process is used therefor. For example, a suitable interpolation process is used in order to "up-sample" to the original resolution.

In the system in accordance with the invention and in the process in accordance with the invention, at least a majority of the necessary image analysis and preferably all image analyses are preferably based on medium to low resolution versions of the original image. A mean resolution thereby corresponds, for example, to a reduction of the original resolution by a factor of 3 to 10 and a low resolution to a reduction of the resolution by a factor of 10 to 100. Alternatively, the low resolution can also be defined in that it encompasses, for example, less than 50,000 image points, preferably less than 10,000 image points, while the mean resolution encompasses less than 1,000,000 image points and preferably more than 10,000 image points but less than 200,000 image points. The term "image point" is herein used synonymously with "image element" or "pixel".

The correction mask, which is preferably an out of focus mask, which can be determined-as mentioned above-need not necessarily be a "brightness mask" as was discussed in the above description of the brightening or darkening of a flash photograph. In general, it can be a correction mask which serves the local influencing of one or more specific image properties, such as, brightness, color tone, color saturation, focus, contrast, detail contrast, and so on. For example, a correction mask can be used in accordance with the process of the invention for the local control of the image focussing. A correction mask for the purpose of a local color tone correction can also be used. For example, the position of the sun and the sky surrounding the sun can be determined in a sunset picture by color tone analysis and/or pattern or structure recognition. The color tone trend from the centre of the sun to distant regions of the sky can preferably be analysed by way of a coarse image. Nominal trends for the color tone trend from the centre of the sun to remote regions of the sky can be determined based on an analysis of a multitude of sunset images. The determined actual trend can be compared with a nominal trend and based thereon first a coarse correction mask and then a correction mask can be created, the elements of which locally change the color tones so that an approximation to the nominal trend results. If the analysis of the color tone trend is carried out by way of the fine image, the correction mask can then of course also be directly calculated from the fine image data, albeit with a higher calculation effort.

Types of correction masks are described in the following. This is carried out, for example, by way of a correction mask to influence the brightness. In this example a color tone of the individual pixels is thereby not to be influenced by the application of the correction mask to the image. The inventors have found that an elevation of the color saturation by application of the correction mask in image regions with certain image properties, especially in under-exposed or over-exposed regions of the image, in general has a positive influence on the aesthetic appearance.

Color images can be represented in different (three dimensional) color spaces. One can essentially distinguish between three types of color spaces:

Recording apparatus dependent color spaces. In those, each pixel is characterized by three color values which directly correspond to the measured values in red, blue and green of the recording apparatus.

Recording apparatus independent color spaces. In those, recording apparatus dependent color values are (as best possible) transformed into a standardized color space which is adapted to the human color perception. The most commonly used is the CIELab color space. The L component ("luminance") is here a brightness measure adapted to the sensitivity of the eye. Accordingly, a mask for the influencing of the brightness will exclusively act on this component.

Image reproducing apparatus adapted color spaces. In those, the three color values of the pixel can be transferred without further adaptation and transformation to a specific type of output apparatus and produce therein an image which with respect to color is perceived as "correct" by a human observer.

For digital cameras, the so called "sRGB" color space has become prevalent (see http://www.color.org). This color space combines the advantages mentioned above under 2 and 3, since it is on the one hand calorimetrically defined (the conversion into CIELab and vice versa is defined by formulas), while on the other hand a representation on a typical color monitor is possible with minimal effort. The color of a pixel is characterized by the RGB triplet, whereby R, G and B are integers in the range of 0–255. The triplet (0,0,0) represents "black" (K) the triplet (255, 255, 255), represents "white" (W). The corresponding rgb color cube is apparent from FIG. 1a. The vector from K to W extends from black through intermediate grey tones to white.

The processes described in the following can be carried out in different color spaces. The color spaces which here form the basis for the calculation are (preferably) three dimensional. Preferred is a color space in which one coordinate describes the brightness, the other two the color (i.e. especially color tone and color saturation). For example, RGB color values can be transformed into such a color space by the transformation described further below. For example, the Lab color space has the above property. The multiplication of a color vector (Lab) with f>1 leads to an increase of both the brightness (L) as well as the color saturation $(a^2+b^2)^{1/2}$. In the RGB color space as well as, for example, in the CNY color space, the coordinates do not directly represent the "color" but also determine the brightness. This separation between color and brightness can be carried out, for example, by the further below described transformation.

For example, the image analysis and the mask calculation is carried out in the system described in EP 1 024 400 and EP 0 475 897 in the color space with is spanned by the first three color effecients of the Karhunen-Love-Transformation of the spectral film densities.

The following, purely exemplary embodiment of the process described herein is based on a color cube, for example, the RGB color cube shown in FIG. 1a, which means the original images and the processed images are present in a format as delivered by the camera.

In such a color space, sensible measures must be definable for the terms "brightness", "color tone", "color saturation". In the case of the illustrated RGB cube, the following measure is used for the "brightness".

$$L=(r+g+b)/3$$

This is, except for a constant factor, the projection of the color vector (R,G,B) onto the "grey axis" KW. Of course, instead of R, G, and B, other independent colors can be used which span a color space such as, for example, C (cyan), N (magenta) and Y (yellow). Depending on the definition of the colors one must of course pay attention to the fact that contrary to the RGB color space, higher values represent a darker image point than lower values. The definition of the brightness measure (L) must then be accordingly adjusted. The following explanation of the embodiment is continued as an example for the (r, g, b) color vector.

For example, instead of the common mean value, a weighted mean value, according to any averaging process, can be used, for example $L=\alpha*r+\beta*g+\gamma*b$ with $\alpha+\beta+\gamma=1$. The green component could thereby, for example, be assigned a higher weight, in particular in view of the fact that the eye in the green range reacts most sensibly to brightness differences.

The inventors have discovered that a balancing of the colors for the determination of a brightness measure, at least for an additive color space as is the case with the RGB color space, leads to very good results.

Figure 2:
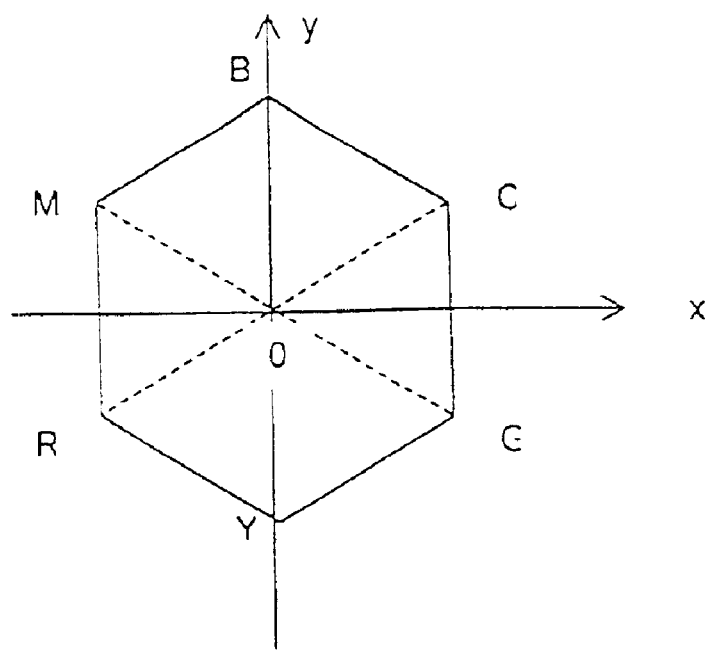
FIG. 2 shows the projection of an RGB cube onto the color plane.

In order to enable an analysis of the image property "color" apart from the image property "brightness", the rgb vectors are perfectly projected onto a plane perpendicular to the grey axis KW, as illustrated in FIG. 2.

In matrix notation, the transformation of an rgb triplet into a brightness value L and two color coordinates (x, y) can be expressed as follows:

$$\begin{bmatrix}L\\x\\Y\end{bmatrix}=\begin{bmatrix}\frac{1}{3} & \frac{1}{3} & \frac{1}{3}\\-\cos(30°) & +\cos(30°) & 0\\-\frac{1}{2} & -\frac{1}{2} & 1\end{bmatrix}*\begin{bmatrix}r\\g\\b\end{bmatrix}$$

Figure 3:
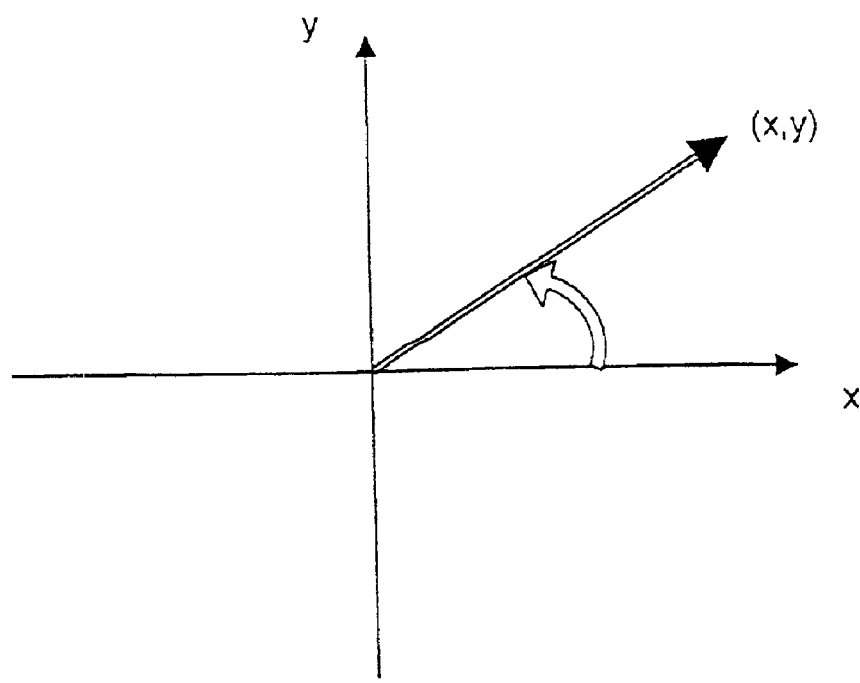
FIG. 3 illustrates color tone and color saturation in the X, Y color plane.

Preferably, the color saturation is defined as the distance of the color point (x,y) from the origin 0 of the color plane. The color tone is preferably defined by the angle enclosed by the color vector with an axis through the origin (see FIG. 3). In the masking, as is used in the analog photography during the exposure process, and in the hybrid masking, as known, for example, from EP 1 024 400, only one type of combination of mask and image is possible, namely the multiplication of the corresponding transmissions or equivalently thereto the addition of the corresponding optical densities, since with the mask a brightness profile of the exposure light can only be locally changed by attenuation.

Figure 1B:
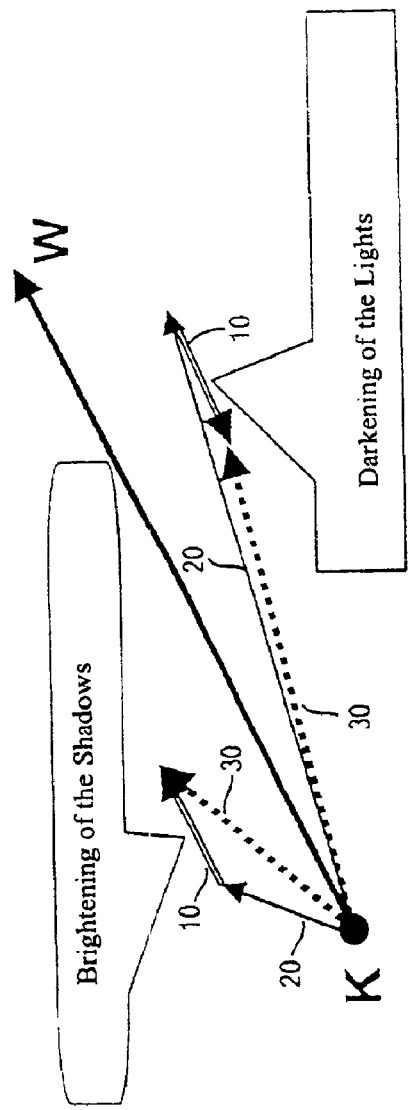
FIG. 1b shows the effect of additive masks.

In the purely digital region of the masking which is described herein, an additive and more or less any other type of mathematical combination, especially a multiplicative combination between original image and correction mask is possible. As is illustrated in FIG. 1b, the addition of a "mask vector" 10 with equal components in r, g and b to an "image vector" 20 causes a change of the brightness, while the color tone and the color saturation remain unchanged. This means the color tone and the color saturation of the resulting image vector 30 correspond to the color tone and the color saturation of the original image vector.

Figure 1C:
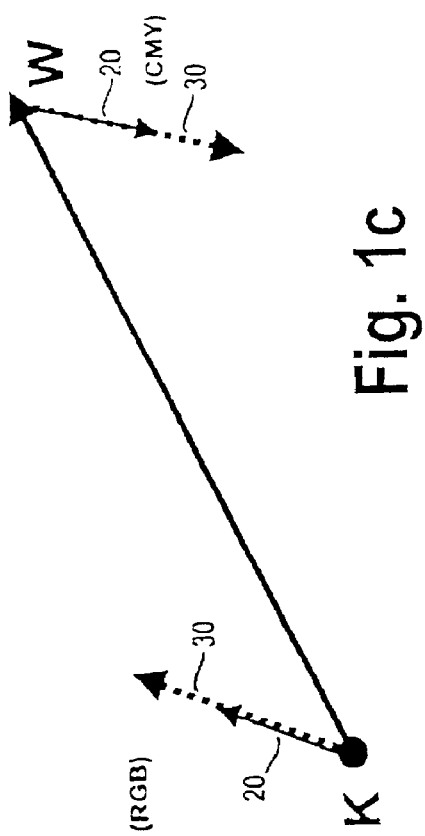
FIG. 1c shows the effect of multiplicative masks.

The multiplication of an image vector with a "mask vector" is illustrated in FIG. 1c. The multiplication causes a change of the original vector 20 into the vector 30 resulting after the multiplication. This also causes a change in brightness. Furthermore, the color tone is left unchanged. However, the multiplication also influences the color saturation.

As already mentioned, an increase of the color saturation especially in the over-exposed (bright) and under-exposed (dark) regions of an image is principally desirable. In under-exposed regions, a multiplication of an rgb vector with a factor >1 leads both to an increase of the brightness as well as to an increase in the color saturation. The two desired goals are thereby simultaneously achieved. However, in over-exposed regions, a factor <1 would need to be used, since the reduction of the brightness is desired. But a factor <1 would negatively affect the color saturation.

Therefore, in accordance with the invention, upon over-exposure, which means especially when the measure for the brightness is larger than a mean brightness value or a threshold value, for example for L>255/2, one not only stretches the RGB vector, but, as illustrated in FIG. 1c, the CMY vector complementary thereto. Again, both desired goals can thereby be simultaneously achieved.

For example, the following multiplicative masking follows for over-exposure:

$$\begin{bmatrix}c\\m\\y\end{bmatrix}=\begin{bmatrix}r\\g\\b\end{bmatrix}-\begin{bmatrix}255\\255\\255\end{bmatrix}$$

$$\begin{bmatrix}c^1\\m^1\\y^1\end{bmatrix}=\begin{bmatrix}c\\m\\y\end{bmatrix}*f \quad f>1$$

$$\begin{bmatrix}r^1\\g^1\\b^1\end{bmatrix}=\begin{bmatrix}c'\\m'\\y'\end{bmatrix}+\begin{bmatrix}255\\255\\255\end{bmatrix}$$

The above mentioned corrected triplets ($r^1$, $g^1$, $b^1$) can also be represented in the case of an over-exposure as follows:

$$\begin{bmatrix}r^1\\g^1\\b^1\end{bmatrix}=f\begin{bmatrix}r\\g\\b\end{bmatrix}-\begin{bmatrix}255\\255\\255\end{bmatrix}(f-1)$$

The values "255" are only examples for maximum values. Since the factor F>1, the right term is larger than 0 and therefore leads to a darkening, which over compensates the brightening caused by the left term. With the factor F one thereby achieves an increase in the color saturation as well as a darkening, which is a function of F and especially is proportional to F. It is thereby achieved that the extent of the correction of the color saturation is a function of the extent of the correction of the brightness.

As will be described further below, the masking is carried out multiplicatively with f>1 for over-exposure and under-exposure, in order to achieve an increase in the color saturation. Accordingly, a lowering of the color saturation would be achievable by a multiplication with f>1, if this would be desired. In the region of mean brightness, which lies outside the above mentioned threshold values, i.e., for example, at about L=255/2, an additive masking is preferred, since the color saturation is not influenced thereby. Thus, in accordance with the invention, the correction of the image property "color saturation" takes place depending on the image property "brightness". Apart from the already mentioned advantages, such as an increase of the color saturation for under-exposure and over-exposure, such an approach for the correction has the following additional reasons.

The corrected image should preferably have the same data format as the original image, which means, that the RGB values of the corrected image should be limited to the range of values of the uncorrected image, for example 0 to 252. Therefore, results obtained upon combination of the correction mask and the image to be corrected which exceed this range should be limited by so-called "clipping" or "cutting". If this clipping is used too often and too massively, this can lead to disturbing artifacts in the corrected image. A few geometrical considerations by way of the RGB cube make it clear that the suggested multiplicative masking and the combination of additive and multiplicative masking herein greatly accommodates the desire to avoid massive and frequent clipping. It can thus be made clear that, if the vector describes a mean brightness, an addition would rather lead to the changed vector still being located within the RGB cube whereby upon a multiplication a higher risks exist that the vector leaves the RGB cube after the correction. Correspondingly, it applies for vectors which represent a strong brightness, that a CMY multiplication ensures that the corrected vector remains within the RGB cube, while with an RGB multiplication the risk would exist that the RGB cube would be exited, so that a "clipping" would occur.

According to one embodiment, the mask is defined as a function of the brightness in the image. For example, the coarse mask can be defined as a function of the brightness in the (low resolution or low pass filtered) coarse image. In a program in accordance with the invention, such functions can be stored in tables (LUT for "lookup table").

According to one embodiment, a function for the calculation of additive masks (coarse correction masks, correction masks) as a function of the brightness has the following properties (see FIG. 4a):

In the low brightness range, the elements of the mask are positive and decrease with decreasing brightness and disappear at L=0.

In the high brightness range, the elements are negative, increase with increasing brightness, and disappear at L=255.

The elements of the mask in the mean brightness range have small values, which in comparison to the corrected brightness are small or they have the value of 0. The transition between positive and negative values takes place at about the mean brightness range.

The positive and negative extreme values mentioned under a) and b) lead to stronger changes. The function preferably is similar to a sine function. It is achieved with the aforementioned embodiment, that rather under-exposed regions are brightened, normally exposed regions are changed little and over-exposed regions are darkened. The above mentioned condition for the function f, namely f (L)=0 (i.e. very small in comparison to the maximum value) for L=0 (or about 0) and L=255 (i.e. equal to the maximum value or about equal to the maximum value) is not binding, but in particular has the following two advantages. For one, as already discussed above, the correction in the highly under-exposed and highly over-exposed regions is preferably carried out such that not only a change of the brightness is achieved, but also the color saturation is increased. In the case of the above embodiment, this means that the correction should preferably be carried out through a factor in the aforementioned manner (and not purely additively). Second, by the above condition, both "black" as well as "white" are not changed by the mask. If a digital camera image is reproduced on a color monitor, its effective control range is not reduced by the masking. In contrast, in other applications, for example for the reproduction of negative film originals on a photographic paper, such a dynamic reduction can be desired.

The function for the calculation of multiplicative masks which can also be realized through LUTs, preferably has the following properties as function of the brightness (see FIG. 4d):

The elements which serve as factor in the aforementioned sense, are 1.

The elements reach their maximum at or very close to L=0 and L=255.

The relatively quickly decrease towards the centre, whereby in the region of mean brightness, the factor is perferably 1 or about 1.

The above property a) has the result that in the over-exposed regions only a darkening of the image takes place while in the under-exposed regions only a brightening of the image occurs. However, in both cases it is connected with an increase in the focus and the color saturation. The increase in the focus occurs in that the change of the brightness is proportional to the factor, whereby differences in the brightness between neighboring pixels, which represent a measure for the focus, also increase proportionally to the factor. With a pure addition, the differences would remain constant, so that the focus would thereby not increase.

The above mentioned properties b) and c) ensure that the multiplicative masking is limited to the extreme exposure values. For color vectors which describe a color value in a color space, the dimensions of which represent colors, such as, for example, in an RGB color space or CNY color space, multiplication with a factor >1, which causes an increase in the color saturation, is then not good when the absolute value of the vector or of individual components of the vector is significantly above the mean values of the data range or at the edge of the data range. Because the vector upon the multiplication could exit the maximally reproducible data range, so that the above described clipping effects occur. Furthermore, normally exposed regions are preferably not masked since one can count in those regions with a good reproduction of the image information at least with respect to brightness and color saturation.

The above mentioned functions are illustrated in FIGS. 4a and 4b. FIG. 4a relates to the additive mask and FIG. 4b relates to the multiplicative factor for the multiplicative mask for the change of both brightness as well as color saturation.

FIG. 4b shows for the multiplicative mask also a steep decrease of the factor for L→0. Such a development is preferred, in order to avoid an increase of the noise in the under-exposed regions. An analogous measure can be taken for extreme over-exposures L→255.

Figure 5B:
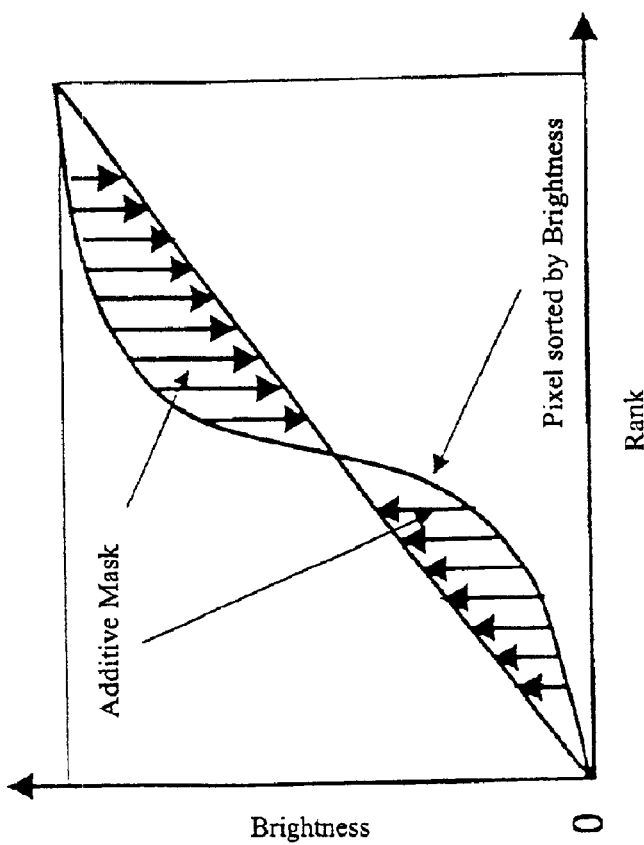
FIG. 5b shows the effect of an additive mask for the histogram equal distribution.
Figure 5A:
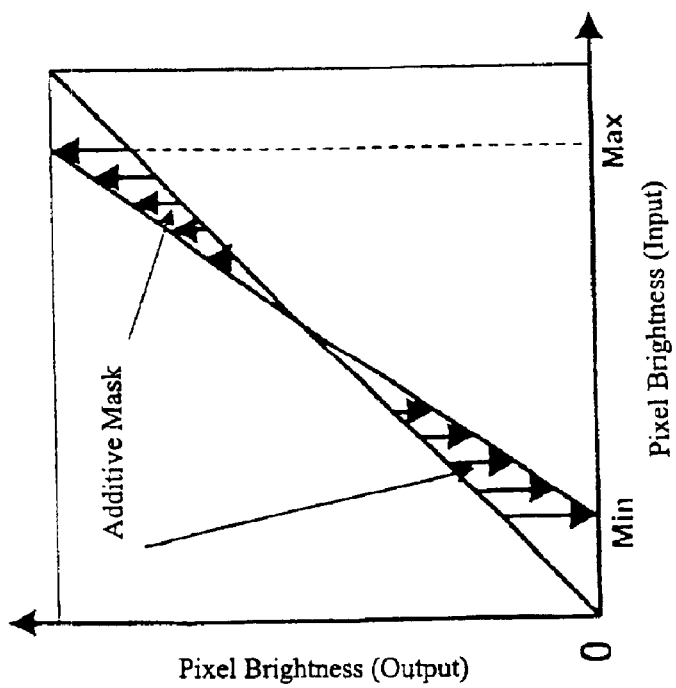
FIG. 5a shows the effect of an additive mask which is used for the expansion of the dynamic region.

FIG. 5a shows a simple process for the improved use of the available dynamic or, expressed differently, for the expansion of the actual data range of an image property.

FIG. 5a relates to the brightness. The brightness after the correction is applied on the ordinate and the one before the correction on the abscissa. The values of the image property before correction are located on a diagonal going through 0. In the example shown in FIG. 5a, they only use the region between Min and Max. In order to widen the data range, an additive mask is used which has the properties indicated by the arrows and which leads to the complete data range being used. The target curve shown in FIG. 5a which is touched by the arrow tips and which indicates the result after the correction, is linear. However, this is not imperative. Preferably, the function is however monotonously increasing. For other applications (for example, if the digital image originates from a negative scanner), the correction mask can also be selected so that a dynamic reduction would result instead of a dynamic increase. An adaptation of the large dynamic range of a negative film to the smaller dynamic range which is represented, for example, by photographic paper, can thereby be achieved.

FIG. 5b illustrates a process for the mask calculation which was carried out with the goal to even out in the image the frequency distribution of the values of one image property, in the present example the brightness values, or to generally influence this frequency distribution. Preferably, this influencing is carried out in such a way that an approximation to a nominal frequency distribution is achieved, which, for example, can be an even distribution.

In order to analyze and determine a frequency distribution, the rank of each and every image element (image portion) in the totality of the image elements (image portions) can be determined, for example, by way of a sorting process for each image element (image portion) in the original image, and preferably in the coarse image due to the lower calculation effort and the lower influence of detail information. Image elements (image portions) with a higher value (higher brightness) are thereby considered of higher rank as those with a smaller value (lower brightness).

When the brightness of the image elements (image portions) is plotted as a function of the pixel rank, a monotonously increasing function results as can be seen, for example, in FIG. 5b as curved function. The function corresponds to the inverse cumulative frequency distribution of the brightness of the image elements. If the brightness values were evenly distributed, a striped diagonal line beginning at 0 would result, which is also apparent from FIG. 5b. An even distribution of the brightness values can be achieved (in the case of the coarse mask, an even distribution of the brightness values of the low resolution) with a mask (in the first step, for example, a coarse mask, then the correction mask determined therefrom), which corrects the brightness of the image elements according to the arrows illustrated in the Figure. An approximation of the distribution of the values of one image property to a nominal distribution or target frequency distribution is thereby achieved.

In the example shown in FIG. 5b, this is achieved by way of an additive mask, which exerts onto the curved actual distribution the effect indicated by the arrows. An additive coarse mask is thereby preferably determined in a first step based on the analysis of the frequency distribution in a coarse image. The correction mask is then determined from the coarse mask by way of an expansion process. In the example shown in FIG. 5b, this is an additive mask. However, as in the previously mentioned case, a multiplicative masking can be carried out (additionally or alternatively), which combines the correction of different image properties, especially the correction of the brightness with a correction of the color saturation. As in the previous case, such a combination can be made dependent from the absolute value of an image property (for example, the absolute value of the brightness) as well as from the extent of the correction of one image property.

As already indicated above, it is preferred in accordance with the invention to carry out the calculation on the basis of an image which does not include detail information, for example, a low resolution image, so that a correction mask determined therefrom only influences the coarse development of the image property (here, brightness), but not the detailed information in the image. For example, the correction mask can be created by interpolation ("upsampling" and "smoothing") from the low frequency mask (coarse mask) After application of the (unfocussed) correction mask onto the image to be corrected the brightness values thereof in the case of the example of FIG. 5b are therefore not evenly distributed, since the detail information was not lost. However, a change of the brightness distribution towards the even distribution results.

The target function illustrated and deemed to be applied in particular for a inverse cumulative frequency distribution in FIG. 5b need not necessarily be linear, as mentioned above. By the choice of a (monotonously increasing) non linear target function principally any (especially approximately gaussian) distribution of the values of the image property (for example the brightness distribution) can be targeted or approximated.

The above mentioned correction process which takes into consideration the frequency distribution of an image property, generally has very positive effect, but can be too massive in certain cases. This can be remedied, for example, as follows.

Figure 6B:
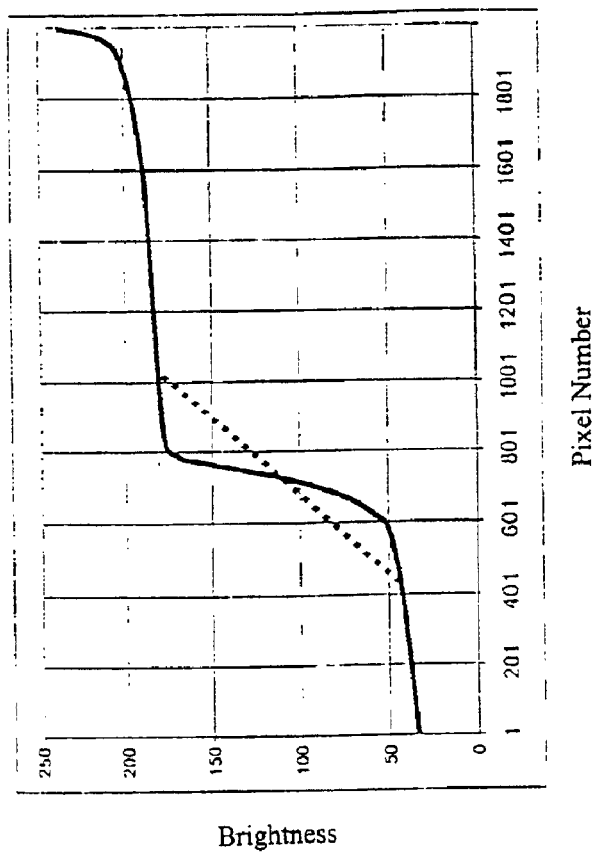
FIG. 6b shows the effect of a soft equalization of the distributions.
Figure 6A:
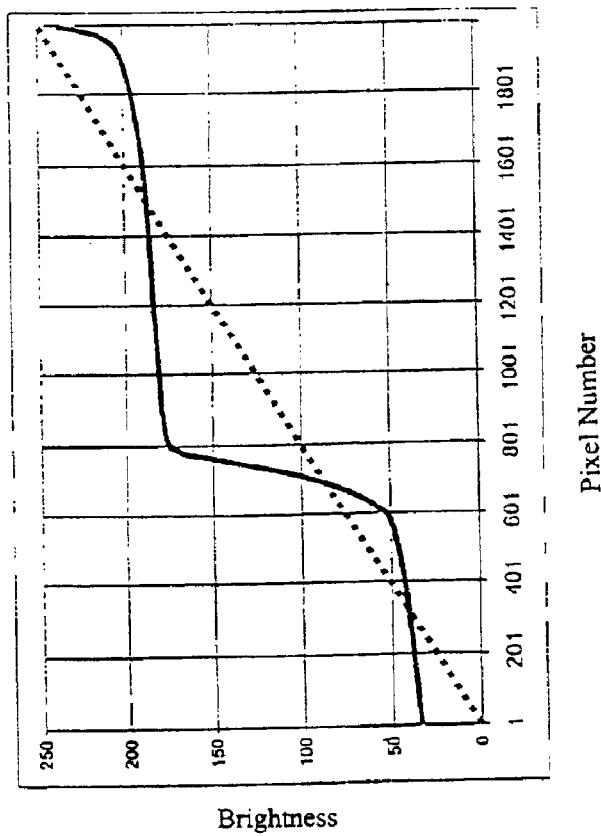
FIG. 6a shows the effect of a radical equalization of the frequency distribution.

The correction achieved by the calculated mask (especially the coarse mask) can be attenuated in that the mask is changed in such a way that, for example, a limitation upward and/or downward is introduced for the elements of the mask. For example, the elements of the mask can also be changed by multiplication with a constant factor <1, or the mentioned two measures can be carried out. Furthermore, a remedy can be achieved in that the target function is adapted to or approximated to a certain degree to the original (inverse) distribution function. An example herefor is shown in FIGS. 6a and 6b. FIG. 6a shows in broken lines a linear, "radical", target function and the continuous line shows the actual distribution into which the nominal distribution represented by the target function is to be transferred or to which it is to be approximated. FIG. 6b shows in broken lines a "softer" image function which is approximated to the continuously drawn actual distribution (pixel number about 400–1000) and otherwise corresponds therewith. As long as the actual curve does not deviate from its maximum or minimum by more than a preselected value, the nominal curve preferably follows the actual curve (for example in FIG. 6b), while a linear course of the nominal curve can be selected therebetween.

The last mentioned process has especially the advantage that it fits well into the above mentioned concepts of the invention whereby a multiplicative masking is used in the strongly over-exposed and under-exposed regions so that one should refrain therefore from a correction which has no influence on the color saturation.

Alternatively, a softer approximation to an even distribution can also be realized in that the actual curve or actual distribution is subjected to a mathematical smoothing process, whereby then the smoothed curve represents the nominal curve.

Over-or under shoots which can be created by the masking and thereby lead to artifacts, can be removed or prevented by the use of minimum filters and maximum filters as is described in EP 1 024 400.

Since the above described different mask types, especially the additive and multiplicative mask types respectively operate differently, and, depending on the circumstances can be used more or less advantageously, a combination, especially a weighted combination of the different masks is preferred. According to one embodiment, different masks which effect different corrections are combined, especially weighted combined. The combination is carried out by mathematical combination, especially addition. The result of the combination is again a mask. The combined mask and the resulting mask can be correction masks or coarse correction masks.

The weighting was optimized by the inventors on the basis of the review of a large number of digital images whereby a largest possible image improvement with simultaneous minimization of disturbing artifacts was achieved.

Preferably, a classification is carried out, especially an automatic classification of the images. The weights are then separately optimized depending on the different classes of images. For example, the weights are stored in table format for the different classes and can be separately recalled for a respective class.

Preferably, characteristic image regions are recognized in accordance with the invention and treated according to separate criteria by the mask correction process in accordance with the invention. The characters image regions can but need not consist of neighboring image elements. Normally, the majority of the image points are neighboring points (for example for skin). Characteristic image regions are for example faces. They often represent for the observer the most important part of the image. However, in original images they often do not have the desired brightness. Especially with flash photographs, the face is often overexposed and with photographs taken into the light, the face is often under-exposed. Another example for a characteristic image region are sky portions. They often appear either too dark or too bright and thereby often "washed out". A further example for a characteristic image region is the vegetation. Especially in shaded regions, it often has a blackish green.

It is advantageous in the above mentioned cases to recognize the characteristic image region to draw corresponding consequences depending thereon during the correction. A number of face recognition processes exist, for example, which are based especially on pattern recognition and do not necessarily need color tone information. Vegetation can also be recognized, for example, through typical structural features which do not need information on the color tone. However, an embodiment is described in the following, which uses the color tone information to then carry out a correction of another image property depending on the color information, in the present example a correction of the brightness, depending on the color tone information.

Thus, it is a special aspect of the present invention that color information is also incorporated into the mask determination. This is especially used for the recognition of characteristic color tones. Since the present correction process allows a local correction, portions of the image which have the characteristic color tone can thereby be corrected. In other words, this allows a specific correction of characteristic image regions.

A preferred approach is described more completely in the following for the example of skin color.

First, a (for example, additive) mask which leads to a brightness correction as described in the preceding sections, is determined without consideration of color information. A "skin mask" (skin coarse mask), representing an example for an auxiliary mask, is calculated as follows on the basis of the low resolution image (coarse image):

On the basis of the color values (for example, coordinates in the above mentioned color plane) associated with the individual image elements, each pixel is assigned a value between, for example 0 and 1, whereby the value of 1 means that it is with high probability skin color, whereas a value of 0 indicates that it is with high probability not skin color.

The value of this "skin indicator", which ranges from 1 to 0 is then entered into the skin mask (skin coarse mask) at the location corresponding to the image element.

The above mentioned originally calculated mask which was determined without consideration of color information (where necessary) is subsequently corrected under consideration of the above mentioned color information as follows:

The brightness mask (brightness coarse mask) is applied to each image element of the low resolution image (coarse image) and the difference between the resulting brightness and the optimal brightness for skin is determined.

This difference is multiplied with the corresponding value of the skin indicator (element of the auxiliary mask), eventually also limited and/or attenuated with a constant factor (analogously to the above embodiment, in order to avoid extremes) and then added to the original value of the brightness mask.

The resulting (corrected) brightness mask is then applied to the original image or the original coarse image. Auxiliary masks which relate to characteristic image regions, such as, for example, skin masks, sky masks or vegetation masks, can also be profitably used for other purposes, namely, for example, for the determination of a mask for image focussing. It is often undesired, for example, to focus skin regions, since otherwise undesired details of the skin may become apparent.

The above mentioned skin indicator represents an example for a measure of match which measures the degree of match of an image portion, which for example includes only one image element, with a characteristic image region. The element of the auxiliary masks define, for instance, respectively such a measure of match. Of course, it is also conceivable that a skin indicator (element of the auxiliary mask) only takes on values 0 or 1. In this less preferred example, the skin indicator (element of the auxiliary mask) then represents a yes/no assignment rule which determines which color tone is to be assigned to a characteristic color tone (element of the auxiliary mask) and thereby which image element is to be assigned to a characteristic image region.

Figure 7B:
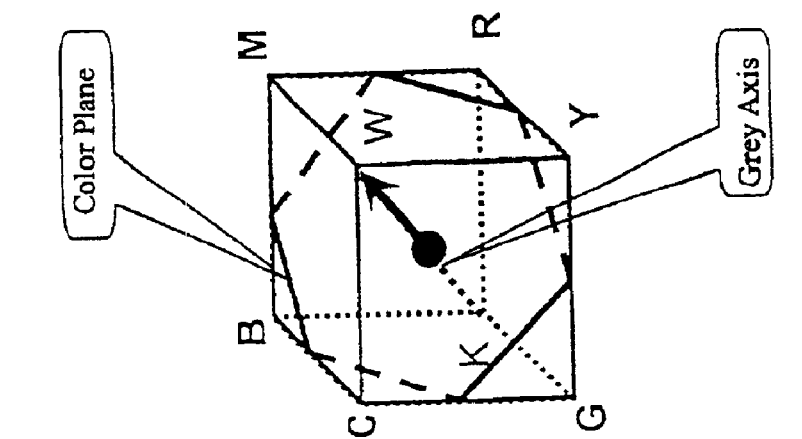
FIG. 7b shows the color plane in an RGB color cube.
Figure 7A:
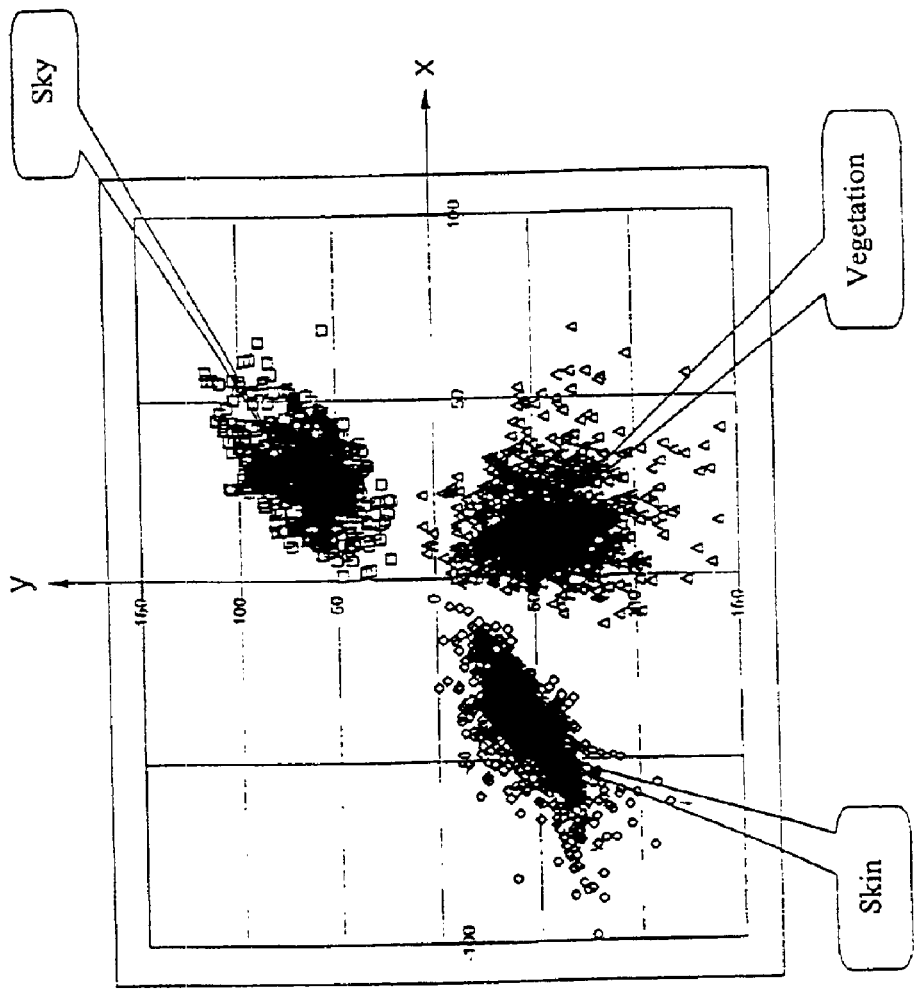
FIG. 7a shows the distribution of characteristic colors in the color plane.

FIG. 7a shows a distribution of image data in the x, y color plane, which is shown in FIGS. 7 and 2. The image data originates from sky, skin, and vegetation regions in the images which were produced with the digital cameras. An accumulation thereby often occurs at the centre of the distributions. It is also apparent that it is relatively easily possible to define regions in which the above mentioned indicators should be 0. Furthermore, such an indicator (measure of match) in the centre of a respective cluster preferably has the value 1.

In order to mathematically describe the match, distribution functions can be defined, for example, which describe the degree of match as a function of the color value. These distribution functions can be created based on statistical analyses which are adapted, for example, with smoothing processes and interpolation processes and stored, for example, in reference tables (LUT). Concretely, a suitable indicator (as function of the x,y co-ordinates of the color plane) can be obtained, for example, in that a two dimensional Gauss distribution is adapted to the empirical distribution of the data and the resulting bell shaped function (standardized for a maximum of 1) is used as indicator function.

The present invention relates to a correction of a multitude of image properties by way of masks. This is described in the following by way of the example of the image focus, which is also an example for an image property.

Figure 8:
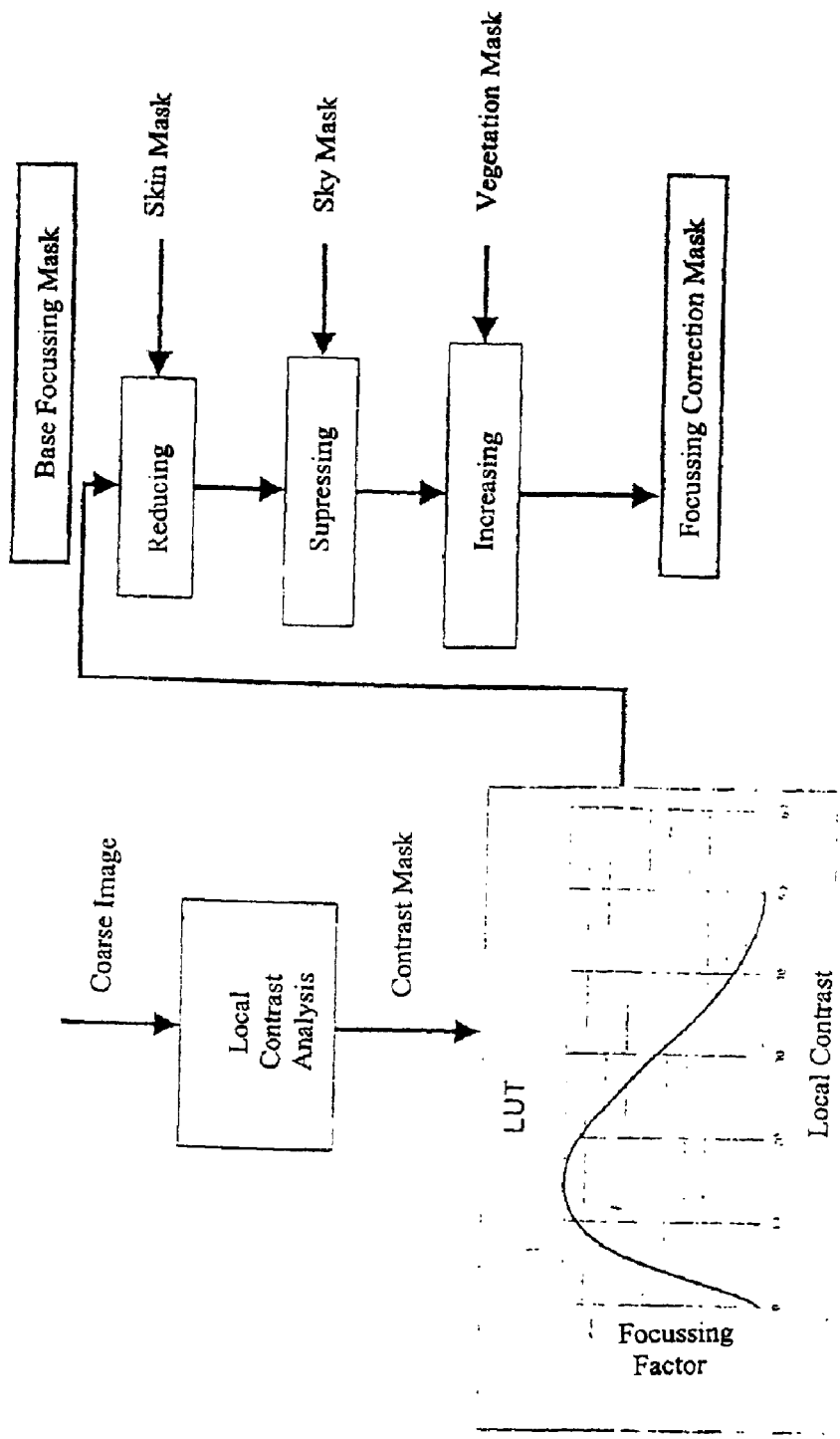
FIG. 8 shows the procedure for local sharpness control.

FIG. 8 shows an example of a local sharpness control.

It is exemplary described in the following how a sharpening correction mask is determined. The description is with reference to FIG. 8. First, a contrast mask is formed, which characterizes the progression of the local contrast in the image. The analysis required therefor is preferably carried out on the basis of a coarse image with a mean image resolution (typically 200×250 pixel). The contrast mask so obtained corresponds to the aforementioned coarse mask. The average image resolution is preferably by a factor of 3 to 20 lower than the resolution of the original image and is obtained from the original image by a data reduction process, for example, by "downsampling", whereby image data of the coarse image represent average values of several neighboring image data of the fine image. The average image resolution is about 20,000 to 200,000 pixels. An original image typically includes over 1,000,000 pixels and typically between 1,000,000 and 5,000,000. As a measure of the contrast, the difference between maximum and minimum brightness in the vicinity of the observed image point, can be used, for example, however as already mentioned above, a color contrast can also be determined and taken into consideration.

The "contrast mask" determined in this way is now converted through a function into a "base sharpening mask". The function is preferably non linear. The function can be defined by a table (LUT). The elements of the base sharpening mask represent sharpening factors and determine a degree of sharpening. The relationship between sharpening factors and local contrast is shown in FIG. 8. The sharpening factors of the base sharpening mask preferably have the following properties:

The sharpening factor decreases in the regional lower contrast. It is avoided herewith that in underexposed regions the noise is increased and that homogeneous image regions (such as, for example, sky) become "grainy" in appearance.

The sharpening factor preferably monotonously decreases to 0 in regions of higher detail contrast. It is achieved herewith that already sharpened image regions are not over sharpened and that no interfering overshoots are created in the region of sharp edges.

The function preferably assumes a maximum in the range of mean detail contrast barriers or at about 10–50%, preferably at about 20–40% of the determined detail contrast.

The function is especially a non-linear function and is preferably adapted and optimized to the outward medium in such a way that the maximum sharpening is achieved without artifacts. This is preferably carried out by way of test patches. Test patches are test images to which the sharpening correction mask is applied which was determined on the basis of the base sharpening mask. By a visual or automatic analysis of the test patches, the quality of the sharpening correction mask and thereby of the non-linear function can be determined. The non-linear function therefore can be optimized in this way by iterative procedures. Test patches are normally made from a stripe pattern, whereby the stripes have different brightness (brightness levels of different height).

The base sharpening mask is preferably a coarse mask, as is the contrast mask, which means it is based on coarse image data which do not contain detail information. The coarse image data are determined from the fine image data by a detail removal process. If a data reduction process (for example, "downsampling") was used as detail removal process, the coarse correction masks have a reduced number of elements, which preferably corresponds to the number elements of the coarse image. The base sharpening mask preferably but not necessarily is present with this reduced number of elements. The base sharpening mask is now in a next process step corrected in order to then finally achieve the sharpening correction mask. The correction is again preferably carried out with a reduced number of elements. In this case, the corrected base sharpening mask must then still be subjected to an expansion process (for example interpolation process), in order to obtain a sharpening correction mask the number of elements of which corresponds to the number of elements of the fine image to be corrected.

The base sharpening mask is preferably corrected based on other masks, so called additional information masks or auxiliary masks. One element of the additional information mask is thereby preferably directly associated with one element of the base sharpening mask and describes the extent of the change of the associated element of the base sharpening mask. The additional information masks (auxiliary masks) are preferably determined on the basis of the coarse image (for example the one which was used as the base for the local contrast analysis), or on the basis of an analysis of the coarse image. For example, the elements of the additional information mask can be a function of the local brightness or the local color saturation or the local color tone. Preferably, the additional information masks represent information on the image content, such as, for example, information on characteristic image regions, such as skin or face. The additional information mask is in this case also referred to as skin mask. Other examples for additional information masks are the sky masks and vegetation masks shown in FIG. 1.

The sharpening factor is preferably reduced in image regions with skin color. This takes into consideration the fact that upon excessive sharpening the impression of "unclean" skin (pimple, beard hair) is created. Concretely, this reduction can be carried out by the multiplication of the sharpening factor with an expression (1.0−R x skin indicator) whereby K is >1, preferably 0.5. The skin indicator is a measure for the probability or match of an image element to a characteristic image region which represents skin. The value of the skin indicator of an image element can be determined, for example, on the basis of the color tone of the image element. Preferably, distribution functions or probability functions are given which determine with what probability or degree of match the certain color tone belongs to a characteristic color (for example skin color). The more a color tone deviates from a characteristic color tone, the smaller is typically the degree of match. From this distribution function or probability distribution, a measure can be determined by way of the color value for whether a certain color value belongs to a characteristic color. The skin indicator is determined therewith, for example.

In image regions with sky color, the sharpening factor is preferably also reduced according to an analogous process or even reduced to 0.

In image regions with vegetation, a strong sharpening is generally preferred. This can be achieved analogous to the above by way of the vegetation mask.

The corrected base sharpening mask finally determined by incorporation of the additional information is brought to the resolution of the image to be sharped (fine image) by way of interpolation ("upsampling" and "smoothing") i.e. a data expansion process.

The original image (fine image) is then subjected to a sharpening process which uses the elements of the sharpening correction mask as parameters. The sharpening process can be, for example, a location variable highpass filtering, as described in A. Polesel, G. Ramponi, "Image Enhancement via Adaptive Unsharp Masking". IEEE Trans. Image Processing, Vol. 9, No. 3, pages 505–510, March 2000. This means that the degree of the sharpening varies from image element to image element on the basis of the value of the elements in the sharpening mask, which are especially clearly signed to the image elements. For example, the elevating of the higher local frequencies depending on the elements of the sharpening correction mask can be changed. The variation of the sharpening is thereby gradually carried out, since the basis for the sharpening correction mask was the coarse image which does not include detail information. The sharpening correction mask can thereby be considered a low frequency (which means unsharped) mask.

As already mentioned above, different possibilities exist to carry out the sharpening locally depending on the correction mask. With the adaptive high pass filter, the values associated with the pixels are changed. In contrast, the warp sharpening in an intermediate step leaves the pixel values unchanged. A displacement of the pixel occurs instead. In this manner, overshoots can be prevented. The functioning of the warp sharpening is described in the above mentioned reference by N. Arad, C. Gotsman. Candidates for edges are thereby searched in the image by way of an edge detector. The output of the edge detector is then softened. A relief filter is thereafter applied and a shift mask derived therefrom. The original pixels are then shifted by the value given in the shift mask. This can be carried out, for example, according to the principle that upon a shift by more than half a pixel, the value of the shifted pixels replace the values of those pixels which were previously at that location. When positions become freed by the shifting process, the old values are maintained, for example. The extent of the shift can be carried out, for example, depending on the elements of the sharpening correction mask.

Since the pixels in such a sharpening process are always shifted towards the edge, the edges are made steeper, by which a sharpening is achieved.

As already mentioned above, the coarse image can be achieved by downsampling or by filtering processes (lowpass filters, Gauss filters) or by filter banks (as described in EP 0 971 315). Thus, a downsampling in a first step and an upsampling at the end of the process is not absolutely necessary, but is preferred because of the thereby required lower processing and storage costs.

Figure 9:
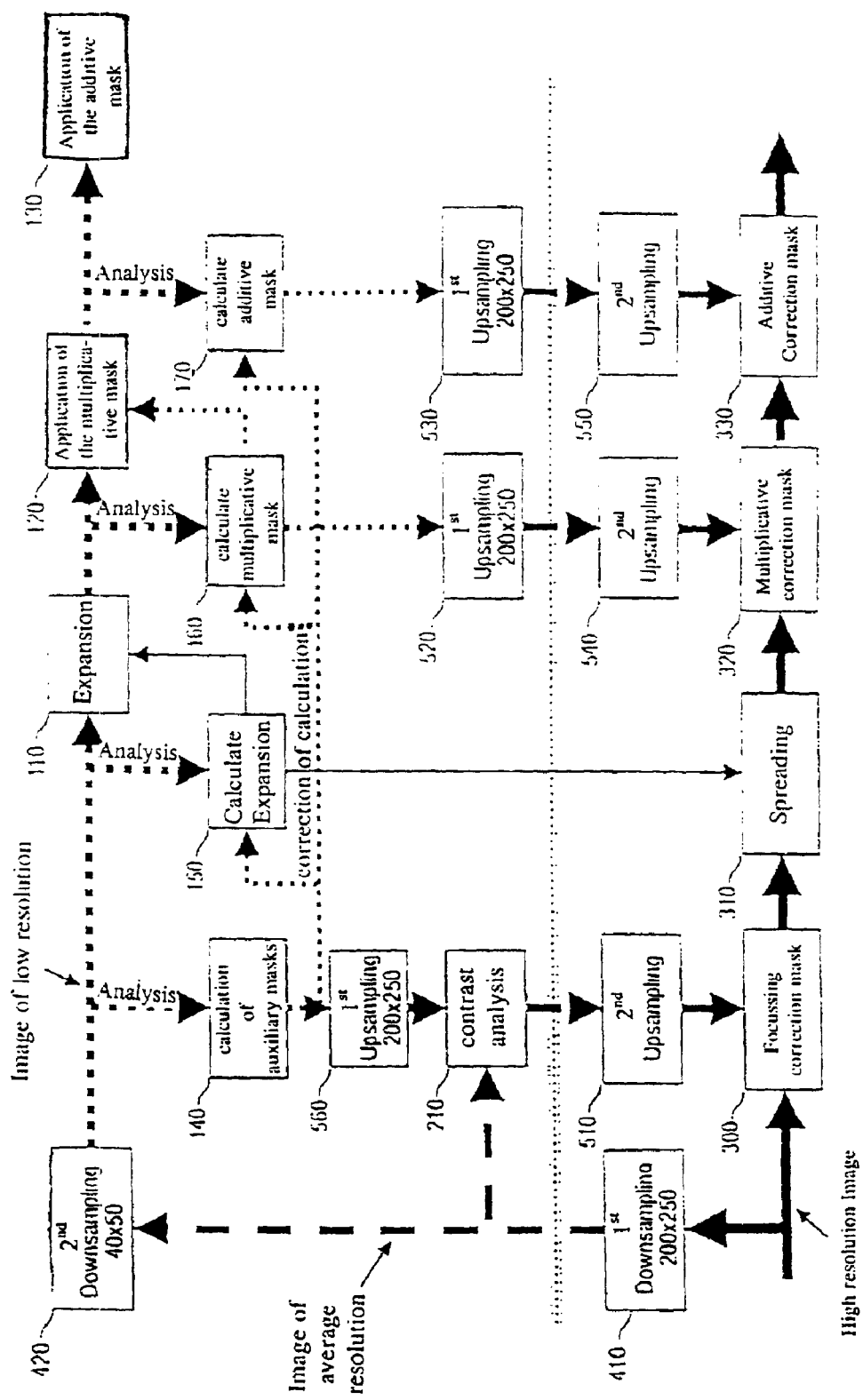
FIG. 9 shows an embodiment for the correction system in accordance with the invention.

FIG. 9 shows an exemplary construction for a collection device in accordance with the invention, whereby the blocks respectively represent units which carry out specific process sections. Alternatively, FIG. 9 can also be considered an illustration of the correction process in accordance with the invention. FIG. 9 especially illustrates the data flow and the cooperation of the individual components of the system.

Reference numbers in FIG. 9 which start with 1 relate to the lowest resolution. Reference numbers which start with 2 relate to the average resolution and reference numbers which start with 3 relate to the highest resolution. Reference numbers which start with 4 relate to a lowering of the resolution and resolution numbers which start with 5 relate to an increase in the resolution. The broken lines in the upper portion of the image relate to the lower resolution. The thick continuous lines in the lower portion of the image relate to a high resolution.

According to the example shown in FIG. 9, an image analysis preferably takes place with the low resolution images. The analysis of the local contrast in block 210 represents an exception. The reduction of the image resolution ("downsampling") is carried out preferably in at least two steps. In the first step, which is carried out in block 410, a reduction occurs of the resolution from the high resolution image (typically over 1,000,000 image elements) to a mean resolution, for example, 200×250 image elements. In block 420 occurs in a second step a further lowering of the image resolution to a low resolution, for example 40×50 image points. The analysis can thereby, if necessary be carried out on images of different resolution.

The coarse correction masks which are used in blocks 110, 120 and 130, are determined based on an analysis of the coarse image, which results from block 420. The coarse correction masks are converted into unfocussed masks (correction masks) which preferably correspond to the resolution of the original image, which means one element of the correction mask corresponds to an image element of the original image or the fine image to be corrected.

The increase in resolution is preferably carried out in the same number of steps as the reduction of the resolution so that masks calculated with different resolution can be combined with one another (for example weighted), even before one proceeds to the next resolution or next higher resolution.

The sequence of the processing steps which are shown in FIG. 9 and which are carried out on the image data can also be differently selected. The illustrated processing chain only serves for the illustration of the concept. For reasons of efficiency, it is naturally sensible to combine the individual processing steps as much as possible.

The blocks 110, 150 and 310 serve the purpose of using the available data range or dynamic range as much as possible and are described in more detail further below. The remaining elements of FIG. 9 are first described in more detail in the following.

At the start, a high resolution image with a multitude of image data which are respectively associated with image elements is received (in the image at the bottom left). The image data are reduced in a first step in block 410 and then again reduced in the block 420. The reduced image data present after the block 420 therefore represent an image of low resolution (coarse image). The block 110 is applied to this coarse image, which leads to a spreading of the data range as will be described further below. A multiplicative mask 120 is then applied to the resulting image data which are still present in the same resolution, which mask, for example, has the above mentioned effects on colour saturation. Finally, in block 130, an additive mask is applied which, for example, changes the brightness profile. Further masks can be applied thereafter which change the image properties.

According to FIG. 9, auxiliary masks are calculated based on the coarse image data in block 130. These auxiliary masks relate, for example, to characteristic image regions, such as skin, sky and vegetation, and can be determined, for example, as described above. By way of these masks, it is known to the system which image elements or image parts belong to the characteristic regions or which are associated with characteristic colour tones.

An expansion of the auxiliary masks to the mean resolution takes place in block 560. The information obtained therefrom is processed in the analysis block 210, which analyses the local sharpness. The analysis of the local sharpness is carried out on the basis of the mean resolution image. The reason for this is that the focus at the position of the image element is defined as a function of the image property (for example brightness) at the location of the image element as well as at the location of neighbouring image elements. A peculiarity of the process in accordance with the invention resides now in that not only local data flow into the analysis of the local sharpness, i.e. data relating to neighbouring image elements, but information on the image content also flows in through the auxiliary masks widened in block 560, and that depending thereon a mask is determined, the elements of which identify or determine a local sharpening which considers respectively local data as well as global image data (such as, for example, the belonging to a characteristics image region). The sharpening mask obtained in block 210 is then expanded in block 510. The expanded focussing correction mask 300 is then applied to the high resolution image data.

The auxiliary masks are preferably used also for the calculation of the reference tables in block 510, which are then used for the expanding of the image data in block 110, as will be further described further below. The information included in the auxiliary masks especially on the image content is preferably also considered for the calculation of the coarse correction masks used in the blocks 120 and 130. The calculation of the multiplicative masks takes place in block 160 and the calculation of the additive masks in block 170. The calculation of the multiplicative and additive masks, i.e. in general of the coarse correction masks, is essentially carried out based on a coarse image and the auxiliary masks are preferably used for the correction of the coarse correction masks calculated this way.

For example, the calculation of the multiplicative masks takes place in block 160 based on the analysis of the coarse image which results from the use of the LUTs in block 110, i.e. after expanding of the image data. The calculated multiplicative masks are then applied in block 120 to the coarse image. They lead, as discussed above, for example, to a change of the brightness in strongly overexposed or underexposed regions and to a simultaneous change in the colour saturation in these regions. Brightness regions not yet corrected by the multiplicative masks can then in a next step, namely in block 130, be corrected by the use of additive masks. The additive masks are thereby preferably calculated from the coarse image, which results in block 120 from the application of the multiplicative masks (or the multiplicative mask).

The coarse mask calculated in block 160 or the calculated coarse masks are then preferably transformed by expansion in block 520 into a mask of average resolution, i.e. with an average number of elements. In a further step, in block 540, the next expansion takes place which leads to a correction mask with a high number of elements. This correction mask is then applied in block 320 to the fine image data to be corrected, which result after the expansion in block 310.

In an analogous manner, as with the multiplicative mask, a mask of average resolution is determined from the additive mask in two steps, namely in block 530, and then a mask with high resolution (correction mask) is determined through a further expansion in block 550. This correction mask which is based on the coarse mask, is then applied in block 330 to the image data which result from the application of the multiplicative masks in block 320.

Different multiplicative correction masks are perfectly combined in Block 160. The coarse image data which are fed into the analysis are therefor analyzed in a different manner, in order to, for example, determine the multiplicative portion of a brightness correction, a contrast correction, a color tone correction, and so on. The different multiplicative portions or different multiplicative masks which are associated with the respective correction are then combined in block 160 to a common multiplicative mask. Before the combination, the individual multiplicative masks are preferably corrected, as desired or required, by way of auxiliary masks. The corrective multiplicative mask is then transferred to the block 520 for the upsampling.

Accordingly, different additive masks are preferably combined in block 160 which respectively represent the additive portion of a certain correction. An example for the additive mask of a brightness correction and its determination is shown in FIG. 4a. The corresponding multiplicative mask 4b is in that example already processed in block 160 and they are combined, for example, with other masks. The additive mask which relates to the brightness correction (compare FIG. 4a) is therefor combined in block 160 with other additive masks, which relate to other corrections (for example, contrast correction). A combined additive mask resulting therefrom is then fed to the block 530 for the upsampling. The different additive masks calculated in block 160 are preferably based on an analysis of the coarse image data which result from the application of the (combined) multiplicative mask. A combination of multiplicative masks is carried out in block 160, the combined multiplicative mask is then preferably applied in block 120. Accordingly, the combined additive mask is preferably applied in block 130, when a combined additive mask is calculated in block 170. Although not illustrated in FIG. 9, additional steps of further multiplicative and additive masks can be added at the right portion of FIG. 9. Of course, masks of other mathematical nature can be used, for example, masks which describe a potentiation or other type of mathematical function.

The expansion to which blocks 110, 150, and 310 relate will be described in the following. The block 150 relates to the calculation of this expansion. The block 110 relates to the application of the expansion onto the coarse image and the block 310 relates to the application of the expansion to the higher resolution image. The expansion block 310 is carried out with the help of a function which was determined in block 150.

It is illustrated in the following why such an expansion is preferably carried out. It must thereby be considered, that the expansion in the process illustrated in FIG. 9 is carried out in a certain portion of the process and in particular after application of the focussing of the image. The expansion can also be carried out at another point, for example, at the beginning of the processing of FIG. 9, i.e. before the focussing.

During the recording of the digital image, it can occur (because of technical limitations of the camera, incorrect adjustments by the photographer, and so on) that a generally under-exposed image is obtained. In that case, the variable control range (for example 0 to 255) in all three colors is only insufficiently used. The image thereby appears too dark and too flat.

Amateur photographs are also often created under unfavourable illumination conditions (incandescent, neon lights and so on). In such cases, the variable control range of at least one of the three colors is only insufficiently used. Such images have a disturbing color tinge.

Such exposure errors and illumination errors are preferably corrected at the beginning of the processing chain (which means before the application of the correction masks such as for example one of the above described additive and multiplicative masks). The process underlying the expansion is illustrated with reference to FIG. 10.

The input data range of an image property (for example brightness or value of a color, for example a value of the R component of the RGB vector) is on the abscissa. The value which results after the application of the expansion process is shown on the ordinate.

The input image data thereby lie in a data range between Min and Max as is indicated on the abscissa. If a radical expansion would be carried out, a straight line would result which would extend in FIG. 10 from the points described by (Min, 0) to the point described by (Max, 255). The value 255 thereby again represents an example for a maximum value.

Figure 10:
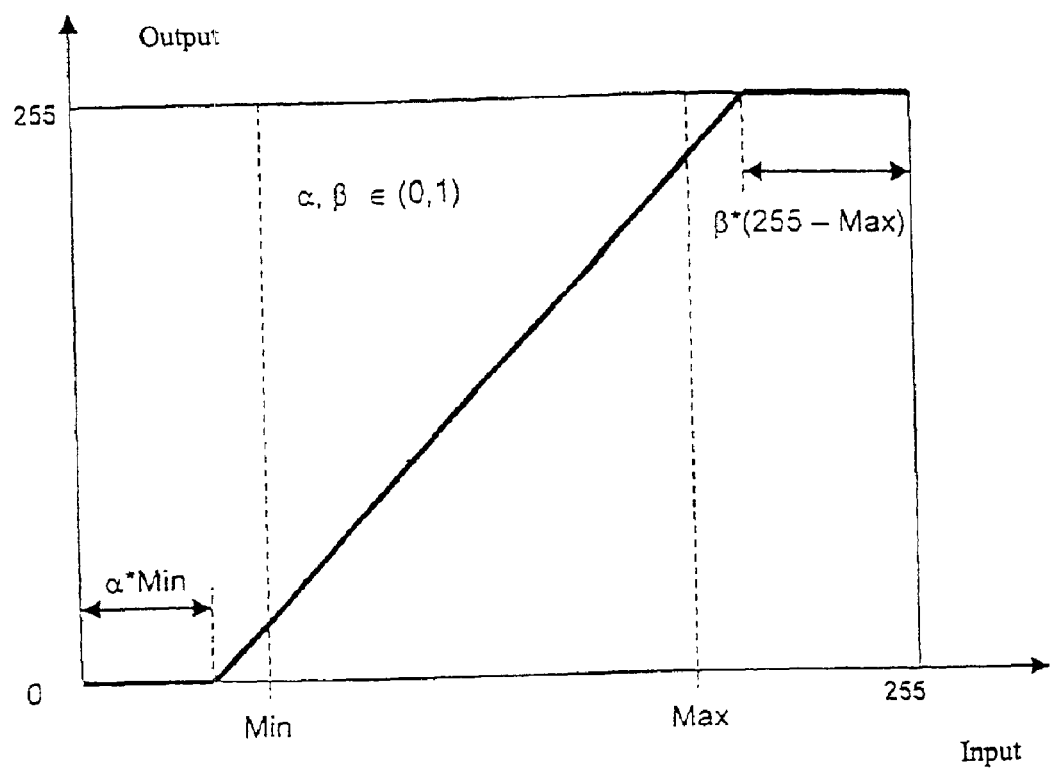
FIG. 10 shows the principle of the expansion of the dynamic range.

However, in accordance with the invention, the function drawn in FIG. 10 as a thick line is preferably determined. The determination of this function is thereby carried out on the basis of a low resolution. The values Min and Max in FIG. 10 represent the minimum and maximum values in the low resolution image. Thus, one assumes that the minimal value in the high resolution image is located left of Min in FIG. 10 and that the maximum value is right of Max in FIG. 10 and that on the basis of the detail information included in the high resolution image.

In order that this information is not lost after the expansion, the function is not designed as would be the case in the above mentioned radical expansion, but as illustrated by a thick line in FIG. 10. Details included in the image can still be reproduced to a certain extent. The "certain extent" is downwardly limited by $\alpha$*Min and upwardly limited by $\beta$*(255-Max). In the case that $\alpha=\beta=1$, the above mentioned radical expansion results and the original image is expanded to the maximum possible range (0 . . . 255) when the function in block 310 of FIG. 9 is applied to the high resolution image.

By suitable selection of the parameters $\alpha$ and $\beta$, one can guarantee that the detail information is maintained while image disturbances or noise which lead to extreme image values are blocked out.

The above described expansion function is preferably stored as a table (LUT).

If exposure errors are to be corrected, one applies preferably one and the same function for all three colors, whereby no change of the color tones results. "Min" and "Max" are advantageously determined on the basis of a lower resolution image, since the values are less sensitive to disturbances, noise, and point-form (local) image peculiarities as was already mentioned above. "Min" and "Max" can be defined as minimal or maximal brightness, however, one preferably uses the minimum or the maximum over the totality of the RGB values, since thereby the already mentioned "clipping" is avoided or reduced. For the determination of "Min", one therefore selects the smallest value amongst the minimum r value, g value and b value.

The spectrum of the light which illuminates the photographic object, influences the color tone captured by the camera. For example, the captured color tone is dependent on whether the photograph is taken in daylight or artificial light. If one wants to correct such illumination errors, the color tones are preferably corrected. One therefore preferably applies different expansion functions to the three colors. "Min" and "Max" can be determined separately for each color, for example. The parameters of and $\beta$ can, for example, also be differently selected for the three colors.

The parameters $\alpha$, $\beta$ can either be fixed or made dependent on the specific image properties or on the image class (for example sunset image, flashlight image, and so on), to which the actual image was assigned. Finally, the parameters $\alpha$ and $\beta$ can also be made dependent from the analysis of the frequency distribution of the variations of an image property (for example brightness) and depending on the progression of the curve of the brightness distribution, different parameters can be chosen.

A choice of parameters adapted to the actual image is especially then useful when the expansion functions are also used for the color correction as was discussed above, for example, in connection with the illumination errors. One can therewith avoid that images in which a certain color is dominant, for example, images with very large sky proportion, are corrected, although the dominant color (for example sky blue) should be maintained. Such an adapted selection of the parameters, can in this case be carried out with the help of the above mentioned auxiliary masks, which recognize characteristic image portions and characteristic colors, whereby it becomes possible to determine whether or not the predominance of a specific color in the image was desired.

What is claimed is:

1. Process for the location dependent correction of photographic image data which represent a photographic image with a multitude of image elements, comprising the steps of:
    a) determining a correction mask with a multitude of correction elements based on the photographic image data to be corrected, whereby the correction elements are assigned to the image elements and, for the image data corresponding to the image elements, define correction changes which correspond to changes to at least one image property; and
    b) applying the correction mask to the image data, whereby the image data are changed according to the correction elements;
    wherein the photographic image data or image data deduced therefrom, which represent an image comprising a plurality of image portions, are analyzed for a predefined image property and are assigned to image property values based on the analysis of the image portions in order to obtain auxiliary masks, wherein
    the image property values represent respectively a value for the predefined image property in the respective image portion and the elements of the auxiliary mask correspond to the image property values, and
    the correction mask is manipulated based on the elements of the auxiliary mask.

2. Process according to claim 1, wherein an image detail removal process is applied to image data to be corrected for deducing coarse image data which represent a coarse image with less image details than the photographic image,
    coarse target values are defined for at least one image property of the coarse image, the coarse target values defining the values which should be adapted by the at least one image property in the image portions of the coarse image, and
    the correction mask is determined based on the coarse target values and the coarse image data such that the correction changes determine a change of the image data to be corrected such that an application of the image detail removal process to the image data corrected by the correction mask would result in corrected coarse image data or results in corrected coarse image data which represent a corrected coarse image, the values of the at least one image property of the corrected coarse image fulfilling the coarse target values or being closer to the coarse target values than the values of the at least one image property of the uncorrected coarse image.

3. Process according to claim 1, comprising the following steps for the determination of the correction mask:
   a) applying to the image data to be corrected an image detail removal process so that the resulting coarse image data represent a coarse image with less details than the original image;
   b) determining a coarse correction mask on the basis of the coarse image, which for the coarse image data fixes coarse changes, which fix the changes to the at least one image property for the coarse image; and
   c) determining at least one further coarse correction mask on the basis of the changed coarse image.

4. Process according to claim 1, wherein the photographic image data describe color values in a color space, the color values are representable by vectors in this color space, and the correction changes include changes which can be represented by a mathematical operation that includes a multiplication of the vectors with a factor.

5. Process according to claim 1, wherein at least two image properties are given, whereby the correction changes correspond to changes of one of the at least two image properties as a function of at least the other of the at least two image properties.

6. Process according to claim 5, wherein one of the at least two image properties is the color saturation and the other image property is the brightness, and the changes of the color saturation are carried out as a function of the brightness and/or as a function of the brightness correction.

7. Process according to claim 5, wherein one of the at least two image properties is selected from a first group consisting of the brightness and the contrast and the other image property is selected from a second group consisting of at least one of the color tone and the color saturation; and the changes to the properties in the first group are carried out as a function of the properties in the second group.

8. Process according to claim 1, wherein at least two image properties are corrected and wherein the determination of the correction changes for one of the at least two image properties is carried out depending to which degree the other image property is corrected and/or pronounced.

9. Process according to claim 8, wherein one of the at least two image properties is the color saturation and the other image property is the brightness, and the changes of the color saturation are carried out as a function of the brightness and/or as a function of the brightness correction.

10. Process according to claim 8, wherein one of the at least two image properties is selected from a first group consisting of the brightness and the contrast and the other image property is selected from a second group consisting of at least one of the color tone and the color saturation; and the changes to the properties in the first group are carried out as a function of the properties in the second group.

11. Process according to one claim 1, comprising the further steps of:
   a) recognizing characteristic image regions which include a multitude of image elements and comprise at least one image property by analyzing the image to be corrected or an image derived therefrom;
   b) assigning to the characteristic image regions target values for the at least one nominal image property which define a target for the values of the at least one image property;
   c) effecting the change by way of the correction mask in such a way that elements of the correction mask which relate to the image elements in the characteristic image region effect a change of the values of the at least one image properties such that the changed values are closer to the target values than the unchanged values or correspond thereto.

12. Process according to claim 11, wherein a degree of match is determined on the basis of the analysis, which determines the degree of match or the probability of match of an image element with a characteristic image region, and the change of the image property is determined under consideration of both the nominal image property as well as the measure of match assigned to the respective image element.

13. Process according to claim 1, wherein a frequency distribution of the at least one image property is determined, the frequency distribution describing the frequency of a value in the image as a function of the image property determined by the value, whereby the values quantify the at least one image property in the image elements and the correction change manipulates the frequency distribution in such a way that it is at least closer to a nominal distribution which is assigned to the quantified image property than the unmanipulated frequency distribution or corresponds thereto.

14. Process according to claim 13, wherein the at least one image property is brightness and/or color tone and/or color saturation and/or color values and the target frequency distribution is such that each value of the image property is at least approximately equally frequent at least within a predefined value range or within predefined value ranges.

15. Process according to claim 13, wherein the predefined image property is different from the image property to be corrected by the correction mask.

16. Process according to claim 13, wherein the manipulation of the correction mask is not only based on the elements of the auxiliary mask but also based on the predefined image property and/or the image property to be corrected by the correction mask.

17. Process according to claim 1, wherein an image detail removal process is applied to the image data to be corrected such that the coarse image data resulting therefrom represent a coarse image which is derived from the photographic image and has less image details than the photographic image,
   wherein the coarse image data define at least one image property of the coarse image;
   a frequency distribution of the at least one image property of the coarse image is determined;
   a target frequency distribution of the determined frequency distribution is defined;
   a coarse correction mask is determined based on the defined target frequency distribution and the determined frequency distribution such that the application of the coarse correction mask to the coarse image data results in a changed frequency distribution which corresponds to the target frequency distribution or which is closer to the target frequency distribution than the unchanged frequency distribution; and
   the correction mask is determined based on the coarse correction mask.

18. Process according to claim 17, wherein the at least one image property is brightness and/or color tone and/or color saturation and/or color values and the target frequency distribution is such that each value of the image property is at least approximately equally frequent at least within a predefined value range or within predefined value ranges.

19. Process according to claim 1, for the expanding of a data range of image data describing an image property, whereby the image data to be expanded encompass an actual data range for a specific image property, which is smaller than the maximum possible data range represented by the image data, comprising the steps of:
- a) determining an expansion function from the image data to be expanded in such a way that the extreme values of the data range of image data expanded with the function at least at one edge of the data range do not take up the extreme values of the maximally possible data range, but are located therewithin, whereby the distance of the extreme values of the expanded data range from the extreme values of the maximally possible data range is determined depending on at least one image property; and
- b) applying the specific expansion function to the image data to be expanded.

20. Process according to claim 1 for the expansion of a data range of image data describing an image property, the image data to be expanded encompassing an actual data range for a specific image property that is smaller than the maximally possible data range represented by the image data, and coarse image data being derived from the image data to be expanded by application of an image detail removal process, whereby the coarse image data represent less image detail than the image data to be expanded, the process comprising the steps of:
- a) determining an expansion function from the coarse image data in such a way that the extreme values of the data range of coarse image data expanded by the function at least at one edge of the data range do not take up the extreme values of the maximally possible data range, but lie therewithin, whereby the distance of the extreme values of the expanded data range from the extreme values of the maximally possible data range is controllable; and
- b) applying the specific expansion function to the image data to be expanded.

21. Apparatus for the location dependent correction of photographic image data representing a photographic image with a multitude of image elements, whereby the image data determine color values and at least one image property for the image elements, the apparatus comprising,
- a) a correction mask determination unit, which determines from the photographic image data to be corrected a correction mask with a multitude of correction elements, whereby the correction elements are assigned to the image elements and determine correction changes for the image data corresponding to the image elements, the correction changes corresponding to changes of the at least one image property; and
- b) an application unit which applies the correction mask onto the image data, whereby the image data are changed by data processing according to the correction elements;

wherein the photographic image data or image data deduced therefrom, which represent an image comprising a plurality of image portions, are analyzed for a predefined image property and are assigned to image property values based on the analysis of the image portions in order to obtain auxiliary masks, wherein the image property values represent respectively a value for the predefined image property in the respective image portion and the elements of the auxiliary mask correspond to the image property values, and the correction mask is manipulated based on the elements of the auxiliary mask.

22. A computer program embodied in a computer readable medium for performing the steps of a
- process for the location dependent correction of photographic image data which represent a photographic image with a multitude of image elements, comprising the steps of:
- a) determining a correction mask with a multitude of correction elements based on the photographic image data to be corrected, whereby the correction elements are assigned to the image elements and, for the image data corresponding to the image elements, define correction changes which correspond to changes to at least one image property; and
- b) applying the correction mask to the image data, whereby the image data are changed according to the correction elements;

wherein the photographic image data or image data deduced therefrom, which represent an image comprising a plurality of image portions, are analyzed for a predefined image property and are assigned to image property values based on the analysis of the image portions in order to obtain auxiliary masks, wherein the image property values represent respectively a value for the predefined image property in the respective image portion and the elements of the auxiliary mask correspond to the image property values, and the correction mask is manipulated based on the elements of the auxiliary mask.

23. A computer storage medium storing the program according to claim 22.

24. Photographic image reproducing installation selected from the group of a photographic printer, a photographic lab, a minilab, comprising an apparatus for the location dependent correction of photographic image data representing a photographic image with a multitude of image elements, whereby the image data determine color values and at least one image property for the image elements, the apparatus comprising,
- a) a correction mask determination unit, which determines from the photographic image data to be corrected a correction mask with a multitude of correction elements, whereby the correction elements are assigned to the image elements and determine correction changes for the image data corresponding to the image elements, the correction changes corresponding to changes of the at least one image property; and
- b) an application unit which applies the correction mask onto the image data, whereby the image data are changed by data processing according to the correction elements;

wherein the photographic image data or image data deduced therefrom, which represent an image comprising a plurality of image portions, are analyzed for a predefined image property and are assigned to image property values based on the analysis of the image portions in order to obtain auxiliary masks, wherein the image property values represent respectively a value for the predefined image property in the respective image portion and the elements of the auxiliary mask correspond to the image property values, and the correction mask is manipulated based on the elements of the auxiliary mask.

25. Photographic image reproducing installation selected from the group of a photographic printer, a photographic lab, a minilab, comprising a control device which carries out for the location dependent correction of photographic image data which represent a photographic image with a multitude of image elements, comprising the steps of:

a) determining a correction mask with a multitude of correction elements based on the photographic image data to be corrected, whereby the correction elements are assigned to the image elements and, for the image data corresponding to the image elements, define correction changes which correspond to changes to at least one image property; and b) applying the correction mask to the image data, whereby the image data are changed according to the correction elements;

wherein the photographic image data or image data deduced therefrom, which represent an image comprising a plurality of image portions, are analyzed for a predefined image property and are assigned to image property values based on the analysis of the image portions in order to obtain auxiliary masks, wherein the image property values represent respectively a value for the predefined image property in the respective image portion and the elements of the auxiliary mask correspond to the image property values, and the correction mask is manipulated based on the elements of the auxiliary mask.

26. Photographic image reproducing installation selected from the group of a photographic printer, a photographic lab, a minilab, comprising a computer on which a program is loaded for performing a process for the location dependent correction of photographic image data which represent a photographic image with a multitude of image elements, comprising the steps of:

a) determining a correction mask with a multitude of correction elements based on the photographic image data to be corrected, whereby the correction elements are assigned to the image elements and, for the image data corresponding to the image elements, define correction changes which correspond to changes to at least one image property; and b) applying the correction mask to the image data, whereby the image data are changed according to the correction elements;

wherein the photographic image data or image data deduced therefrom, which represent an image comprising a plurality of image portions, are analyzed for a predefined image property and are assigned to image property values based on the analysis of the image portions in order to obtain auxiliary masks, wherein the image property values represent respectively a value for the predefined image property in the respective image portion and the elements of the auxiliary mask correspond to the image property values, and the correction mask is manipulated based on the elements of the auxiliary mask.

27. Process for the location dependent correction of photographic image data which represent a photographic image with a multitude of image elements, comprising the steps of:

a) determining a correction mask with a multitude of correction elements based on the photographic image data to be corrected, whereby the correction elements are assigned to the image elements and, for the image data corresponding to the image elements, define correction changes which correspond to changes to at least one image property; and b) applying the correction mask to the image data, whereby the image data are changed according to the correction elements;

wherein an image detail removal process is applied to the image data to be corrected such that the coarse image data resulting therefrom represent a coarse image which is derived from the photographic image and has less image details than the photographic image, wherein the coarse image data define at least one image property of the coarse image;

a frequency distribution of the at least one image property of the coarse image is determined;

a target frequency distribution of the determined frequency distribution is defined;

a coarse correction mask is determined based on the defined target frequency distribution and the determined frequency distribution such that the application of the coarse correction mask to the coarse image data results in a changed frequency distribution which corresponds to the target frequency distribution or which is closer to the target frequency distribution than the unchanged frequency distribution; and the correction mask is determined based on the coarse correction mask.

28. Process for the location dependent correction of photographic image data which represent a photographic image with a multitude of image elements, comprising the steps of:

a) determining a correction mask with a multitude of correction elements based on the photographic image data to be corrected, whereby the correction elements are assigned to the image elements and, for the image data corresponding to the image elements, define correction changes which correspond to changes to at least one image property:

b) applying the correction mask to the image data, whereby the image data are changed according to the correction elements; and for the expanding of a data range of image data describing an image property, whereby the image data to be expanded encompass an actual data range for a specific image property, which is smaller than the maximum possible data range represented by the image data, comprising the steps of:

a) determining an expansion function from the image data to be expanded in such a way that the extreme values of the data range of image data expanded with the function at least at one edge of the data range do not take up the extreme values of the maximally possible data range, but are located therewithin, whereby the distance of the extreme values of the expanded data range from the extreme values of the maximally possible data range is determined depending on at least one image property; and b) applying the specific expansion function to the image data to be expanded.

29. Process for the location dependent correction of photographic image data which represent a photographic image with a multitude of image elements, comprising the steps of:

a) determining a correction mask with a multitude of correction elements based on the photographic image data to be corrected, whereby the correction elements are assigned to the image elements and, for the image data corresponding to the image elements, define correction changes which correspond to changes to at least one image property;

b) applying the correction mask to the image data, whereby the image data are changed according to the correction elements; and for the expansion of a data range of image data describing an image property, the image data to be expanded encompassing an actual data range for a specific image property that is smaller than the maximally possible data range represented by the image data, and coarse image data being derived from the image data to be expanded by application of an image detail removal process, whereby the coarse image data represent less image detail than the image data to be expanded, the process comprising the steps of:

a) determining an expansion function from the coarse image data in such a way that the extreme values of the data range of coarse image data expanded by the function at least at one edge of the data range do not take up the extreme values of the maximally possible data range, but lie therewithin, whereby the distance of the extreme values of the expanded data range from the extreme values of the maximally possible data range is controllable; and b) applying the specific expansion function to the image data to be expanded.

30. Process for the location dependent correction of photographic image data which represent a photographic image with a multitude of image elements, comprising the steps of:

a) determining a correction mask with a multitude of correction elements based on the photographic image data to be corrected, whereby the correction elements are assigned to the image elements and, for the image data corresponding to the image elements, define correction changes which correspond to changes to at least one image property;

b) applying the correction mask to the image data, whereby the image data are changed according to the correction elements;

c) recognizing characteristic image regions which include a multitude of image elements and comprise at least one image property by analyzing the image to be corrected or an image derived therefrom;

d) assigning to the characteristic image regions target values for the at least one nominal image property which define a target for the values of the at least one image property; and e) effecting the change by way of the correction mask in such a way that elements of the correction mask which relate to the image elements in the characteristic image region effect a change of the values of the at least one image properties such that the changed values are closer to the target values than the unchanged values or correspond thereto;

wherein the degree of match is determined on the basis of the analysis, which determines the degree of match or the probability of match of an image element with a characteristic image region, and the change of the image property is determined under consideration of both the nominal image property as well as the measure of match assigned to the respective image element.

* * * * *